United States Patent
Mondello et al.

(10) Patent No.: US 11,349,636 B2
(45) Date of Patent: *May 31, 2022

(54) LOCAL LEDGER BLOCK CHAIN FOR SECURE UPDATES

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 529 days.

This patent is subject to a terminal disclaimer.

(21) Appl. No.: 16/362,877

(22) Filed: Mar. 25, 2019

(65) Prior Publication Data
US 2020/0313851 A1    Oct. 1, 2020

(51) Int. Cl.
*H04L 9/06* (2006.01)
*H04L 9/32* (2006.01)
*G06F 3/06* (2006.01)

(52) U.S. Cl.
CPC .......... *H04L 9/0637* (2013.01); *G06F 3/0602* (2013.01); *G06F 3/064* (2013.01); *G06F 3/0655* (2013.01); *G06F 3/0673* (2013.01); *H04L 9/0643* (2013.01); *H04L 9/3247* (2013.01); *H04L 2209/38* (2013.01)

(58) Field of Classification Search
CPC ... H04L 9/0637; H04L 9/0643; H04L 9/3247; H04L 2209/38; H04L 9/3239; G06F 3/0655; G06F 3/0673; G06F 3/064; G06F 3/0602; G06F 3/0623; G06F 3/0619; G06F 3/0679
See application file for complete search history.

(56) References Cited

U.S. PATENT DOCUMENTS

| | | |
|---|---|---|
| 2016/0260169 A1 | 9/2016 | Arnold et al. |
| 2017/0046792 A1 | 2/2017 | Haldenby et al. |
| 2017/0244757 A1 | 8/2017 | Castinado et al. |

(Continued)

FOREIGN PATENT DOCUMENTS

WO    2016-200885 A1    12/2016

OTHER PUBLICATIONS

International Search Report and Written Opinion from related International Application No. PCT/US2020/022913, dated Jul. 6, 2020, 10 pages.

(Continued)

*Primary Examiner* — Mohammad W Reza
(74) *Attorney, Agent, or Firm* — Brooks, Cameron & Huebsch, PLLC

(57) ABSTRACT

The present disclosure includes apparatuses, methods, and systems for using a local ledger block chain for secure updates. An embodiment includes a memory, and circuitry configured to receive a global block to be added to a local ledger block chain for validating an update for data stored in the memory, where the global block to be added to the local ledger block chain includes a cryptographic hash of a current local block in the local ledger block chain, a cryptographic hash of the data stored in the memory to be updated, where the current local block in the local ledger block chain has a digital signature associated therewith that indicates the global block is from an authorized entity.

25 Claims, 12 Drawing Sheets

(56) References Cited

U.S. PATENT DOCUMENTS

2017/0346693 A1* 11/2017 Dix ...................... H04L 9/3265
2018/0248880 A1    8/2018 Sardesai et al.
2018/0374173 A1* 12/2018 Chen ................... G06Q 50/184
2019/0372772 A1* 12/2019 Novotny ............... H04L 9/3239
2020/0184448 A1*  6/2020 Jain .................... G06Q 20/389

OTHER PUBLICATIONS

U.S. Appl. No. 15/853,498, entitled, "Physical Unclonable Function Using Message Authentication Code", filed Dec. 22, 2017, 28 pages.
U.S. Appl. No. 16/201,652, entitled, "Parking Infrastructure Powered by a Decentralized, Distributed Database", filed Nov. 27, 2018, 27 pages.
U.S. Appl. No. 15/993,119, entitled, "Transmission of Vehicle Route Information by Passive Devices", filed May 30, 2018, 25 pages.
U.S. Appl. No. 16/034,763, entitled, "Secure Vehicular Communication", filed Jul. 13, 2018, 37 pages.
U.S. Appl. No. 16/034,809, entitled, "Secure Vehicular Services Communication", filed Jul. 13, 2018, 36 pages.
PCT International Application No. PCT/IB2019/000089, entitled, "Method for Improving Safety of a Component or System Running a Firmware or a Finite State Machine", filed Feb. 22, 2019, 42 pages.

* cited by examiner

US 11,349,636 B2

LOCAL LEDGER BLOCK CHAIN FOR SECURE UPDATES

TECHNICAL FIELD

The present disclosure relates generally to semiconductor memory and methods, and more particularly, to using memory as a local block in a local ledger block chain.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory. Non-volatile memory may be used in a wide range of electronic applications such as personal computers, portable memory sticks, digital cameras, cellular telephones, portable music players such as MP3 players, movie players, among others.

Flash memory devices can include memory cells storing data in a charge storage structure such as a floating gate, for instance. Flash memory devices typically use a one-transistor memory cell that allows for high memory densities, high reliability, and low power consumption. Resistance variable memory devices can include resistive memory cells that can store data based on the resistance state of a storage element (e.g., a resistive memory element having a variable resistance).

Memory cells can be arranged into arrays, and memory cells in an array architecture can be programmed to a target (e.g., desired) state. For instance, electric charge can be placed on or removed from the charge storage structure (e.g., floating gate) of a flash memory cell to program the cell to a particular data state. The stored charge on the charge storage structure of the cell can indicate a threshold voltage (Vt) of the cell. A state of a flash memory cell can be determined by sensing the stored charge on the charge storage structure (e.g., the Vt) of the cell.

Many threats can affect the data stored in the memory cells of a memory device. Such threats can include, for example, faults occurring in the memory device, and/or threats from hackers or other malicious users. Such threats can cause significant financial loss, and/or can present significant safety and/or security issues.

DETAILED DESCRIPTION

Figure 1:
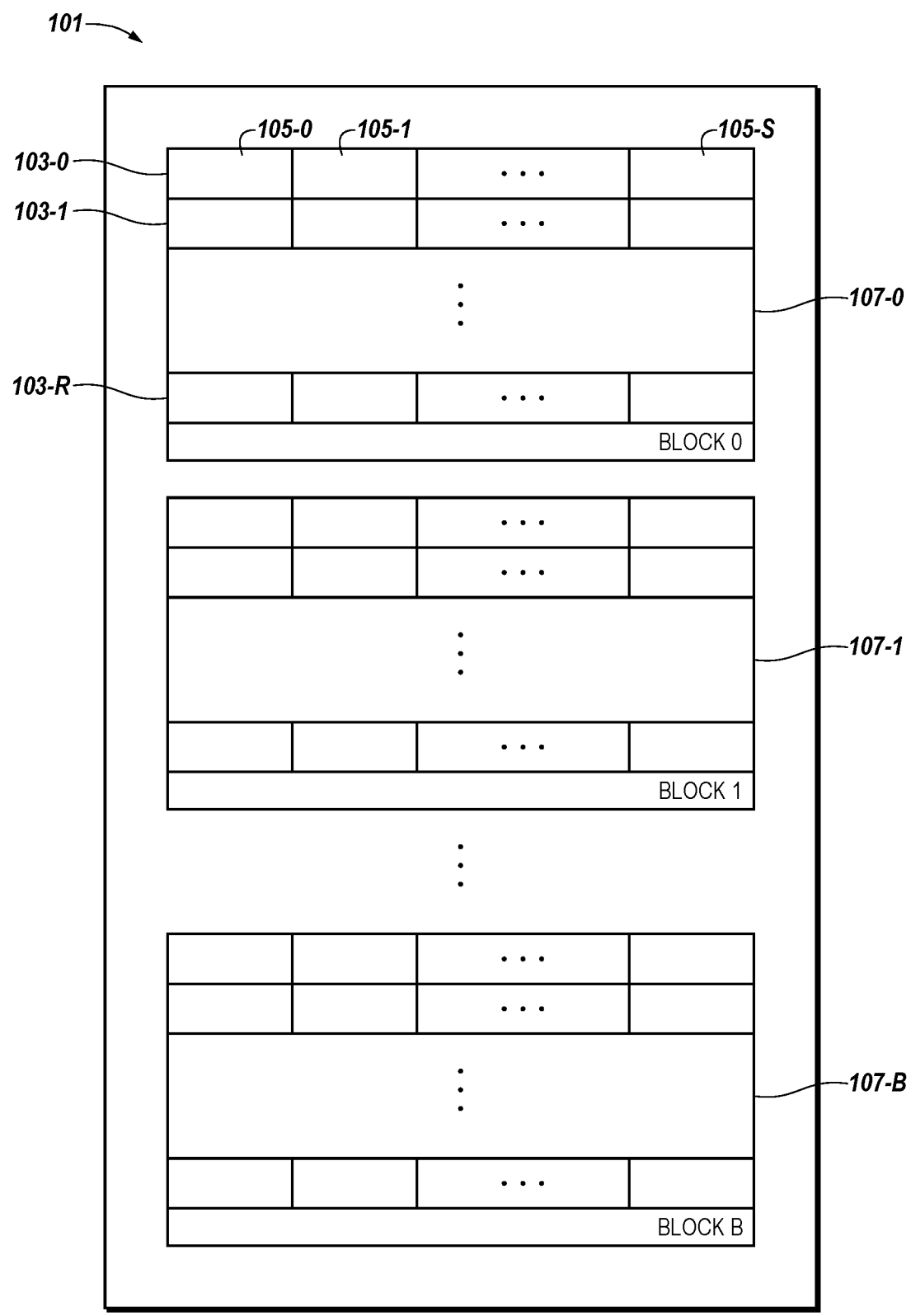
FIG. 1 illustrates a diagram of a portion of a memory array having a number of physical blocks in accordance with an embodiment of the present disclosure.

The present disclosure includes apparatuses, methods, and systems for using memory as a local block in a local ledger block chain. An embodiment includes a memory, and circuitry configured to generate a local ledger block chain comprising blocks received from a global ledger block chain. The global ledger block chain includes blocks containing data about an update (e.g., transactions, software updates, hardware updates, or data that would otherwise modify software, hardware, code, or portions of code, etc.). Each block of the global ledger block chain may be associated with an individual host or multiple hosts. As described herein, memory and circuitry may be configured to receive multiple global blocks from a global ledger block chain to generate a local ledger block chain, where the local ledger block chain includes only blocks related to a host and/or memory associated with the circuitry. The memory and circuitry can determine which of the received global blocks are associated with the host and/or memory and can discard the global blocks that are determined to be unrelated. The blocks in the local ledger block chain can be used for validating data stored in the memory which may be updated via data in the payload of the local block, where the local block includes a cryptographic hash of a previous local block in the local ledger block chain and a cryptographic hash of the data stored in the memory to be updated. The global block has a digital signature associated therewith that indicates the global block is related to the host and is added to the in the local ledger block chain. In some embodiments, a particular and/or specific physical block of memory in a memory, as described FIG. 1, may be used as such a local block in a local ledger block chain.

Many threats can affect the data stored in a memory (e.g., in a memory device). For example, faults may occur in the array and/or circuitry of the memory, which can result in errors occurring in the data. As an additional example, a hacker or other malicious user may attempt to perform activities to make unauthorized changes to the data for malicious purposes. Such activities performed by a hacker may include providing a fraudulent update to software or hardware of a host device. For instance, a malicious user may attempt to alter the data stored in a memory via an update in order to adversely affect (e.g., divert the flow of) a commercial transaction being performed using the memory (e.g., to falsely indicate that payment has been made for the service being provided by skipping the code that verifies the payment), a software license check being performed on the memory (e.g., to falsely indicate the software of the memory is properly licensed by skipping the code that verifies the license), or automotive control being performed using the memory (e.g., to skip a check of the genuineness of a part, an environmental check, or a check of a malfunctioning alarm), among other types of hacking activities. Such hacking activities (e.g., attacks) can cause significant financial loss, and/or can present significant safety and/or security issues.

As such, in order to ensure a secure memory system and secure updates to the memory system, it is important to validate (e.g., authenticate and/or attest) that the update to the data stored in the memory is genuine (e.g., is the correct, from an authentic/authorized entity), and has not been altered and/or fraudulently provided by hacking activity or other unauthorized and/or unintended changes. Embodiments of the present disclosure can use memory as a local block in a local ledger block chain data structure (e.g. use the memory as a storage component for the local ledger block chain) in order to effectively validate the update to be applied to data stored in the memory, and thereby ensure a secure memory system. For instance, embodiments of the present disclosure can modify, utilize, and/or differently operate the existing circuitry of the memory (e.g., the existing firmware of the memory device) to use the memory as a local block in a local ledger block chain, such that the memory can be used as the local block in the local ledger block chain without having to add additional (e.g., new) components or circuitry to the memory.

As used herein, "a", "an", or "a number of" can refer to one or more of something, and "a plurality of" can refer to two or more such things. For example, a memory device can refer to one or more memory devices, and a plurality of memory devices can refer to two or more memory devices. Additionally, the designators "R", "B", "S", and "N", as used herein, particularly with respect to reference numerals in the drawings, indicates that a number of the particular feature so designated can be included with a number of embodiments of the present disclosure. The number may be the same or different between designations.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2.

FIG. 1 illustrates a diagram of a portion of a memory array 101 having a number of physical blocks in accordance with an embodiment of the present disclosure. Memory array 101 can be, for example, a flash memory array such as a NAND, and/or NOR flash memory array. In one example embodiment, the memory 101 is a NOR flash memory array 101. As an additional example, memory array 101 can be a resistance variable memory array such as a PCRAM, RRAM, MMRAM, or spin torque transfer (STT) array, among others. However, embodiments of the present disclosure are not limited to a particular type of memory array. Further, memory array 101 can be a secure memory array, as will be further described herein. Further, although not shown in FIG. 1, memory array 101 can be located on a particular semiconductor die along with various peripheral circuitry associated with the operation thereof.

As shown in FIG. 1, memory array 101 has a number of physical blocks 107-0 (BLOCK 0), 107-1 (BLOCK 1), ..., 107-B (BLOCK B) of memory cells. The memory cells can be single level cells and/or multilevel cells such as, for instance, two level cells, triple level cells (TLCs) or quadruple level cells (QLCs). As an example, the number of physical blocks in memory array 101 may be 128 blocks, 512 blocks, or 1,024 blocks, but embodiments are not limited to a particular power of two or to any particular number of physical blocks in memory array 101.

A number of physical blocks of memory cells (e.g., blocks 107-0, 107-1, ..., 107-B) can be included in a plane of memory cells, and a number of planes of memory cells can be included on a die. For instance, in the example shown in FIG. 1, each physical block 107-0, 107-1, ..., 107-B can be part of a single die. That is, the portion of memory array 101 illustrated in FIG. 1 can be a die of memory cells.

As shown in FIG. 1, each physical block 107-0, 107-1, ..., 107-B includes a number of physical rows (e.g., 103-0, 103-1, ..., 103-R) of memory cells coupled to access lines (e.g., word lines). The number of rows (e.g., word lines) in each physical block can be 32, but embodiments are not limited to a particular number of rows 103-0, 103-1, ..., 103-R per physical block. Further, although not shown in FIG. 1, the memory cells can be coupled to columns of sense lines (e.g., data lines and/or digit lines).

As one of ordinary skill in the art will appreciate, each row 103-0, 103-1, ..., 103-R can include a number of pages of memory cells (e.g., physical pages). A physical page refers to a unit of programming and/or sensing (e.g., a number of memory cells that are programmed and/or sensed together as a functional group). In the embodiment shown in FIG. 1, each row 103-0, 103-1, ..., 103-R comprises one physical page of memory cells. However, embodiments of the present disclosure are not so limited. For instance, in an embodiment, each row can comprise multiple physical pages of memory cells (e.g., one or more even pages of memory cells coupled to even-numbered data lines, and one or more odd pages of memory cells coupled to odd numbered data lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

As shown in FIG. 1, a page of memory cells can comprise a number of physical sectors 105-0, 105-1, ..., 105-S (e.g., subsets of memory cells). Each physical sector 105-0, 105-1, ..., 105-S of cells can store a number of logical sectors of data. Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 105-0, 105-1, ..., 105-S, can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA may also correspond (e.g., dynamically map) to a physical address, such as a physical block address (PBA), that may indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks 107-0, 107-1, ..., 107-B, rows 103-0, 103-1, ..., 103-R, sectors 105-0, 105-1, ..., 105-S, and pages are possible. For example, rows 103-0, 103-1, ..., 103-R of physical blocks 107-0, 107-1, ..., 107-B can each store data corresponding to a single logical sector which can include, for example, more or less than 512 bytes of data.

Figure 2A:
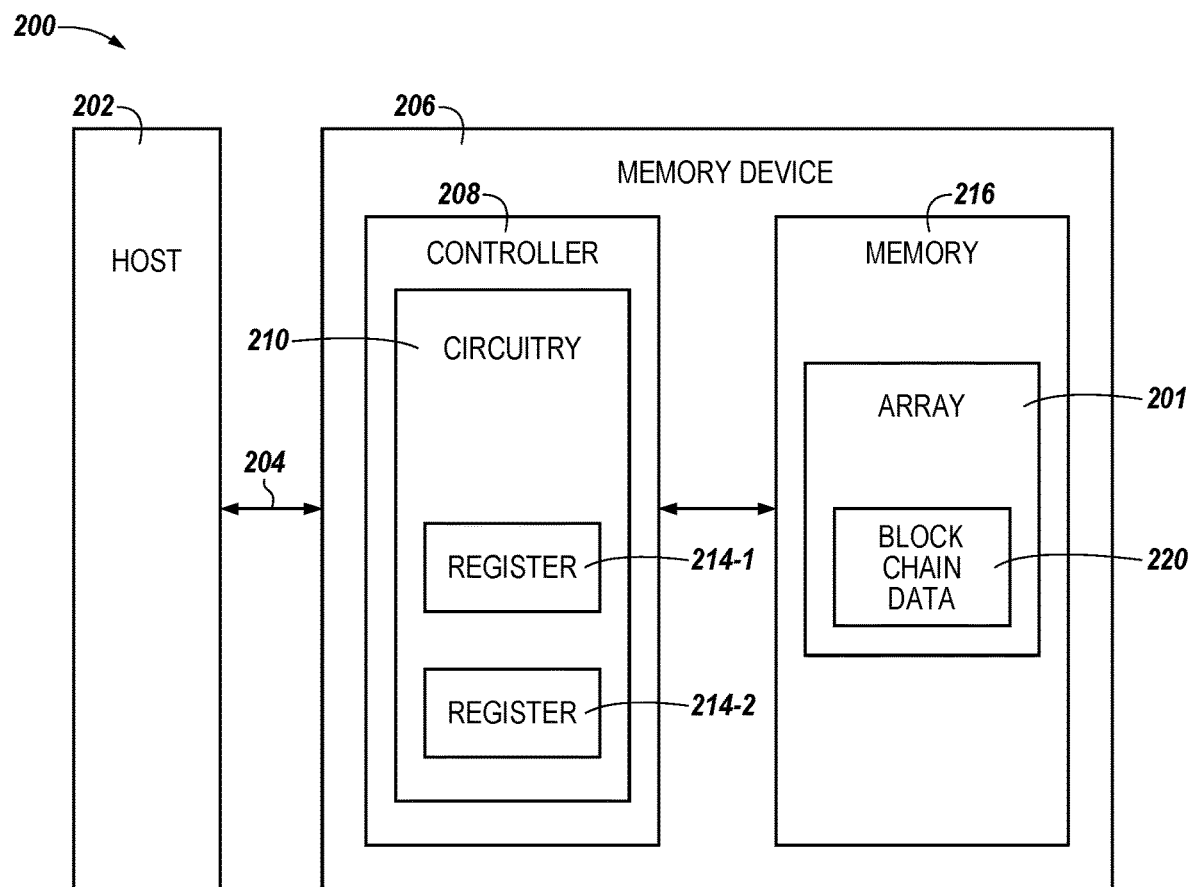
FIG. 2A is a block diagram of a computing system including a host and an apparatus in the form of a memory device in accordance with an embodiment of the present disclosure.

FIG. 2A is a block diagram of a computing system 200 including a host 202 and an apparatus in the form of a memory device 206 in accordance with an embodiment of the present disclosure. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 200 can include a number of memory devices analogous to memory device 206. In one example embodiment, as shown more in FIG. 2B, computing system 200 may represent a node within a larger network of nodes such as a distributed, peer to peer network.

In the embodiment illustrated in FIG. 2A, memory device 206 can include a memory 216 having a memory array 201. As shown in FIG. 2, memory 216 can store "block chain data" 220, used in block chain technology systems, in the memory array 201. A "block" of block chain data in a block chain technology system can include data (e.g., payload), headers, encryption, history, timestamps, etc. As will be described further herein in connection with FIGS. 3 and 4, the block chain data 220 may be "local block chain" data and/or "global block chain" data and may include a stored global block chain ledger (e.g., "global ledger block chain" data) and/or a stored local block chain ledger (e.g., "local ledger block chain" data).

Memory array 201 can be analogous to memory array 101 previously described in connection with FIG. 1. However, as used herein a block of block chain data in a block chain architecture does not have to equate to the size of a block of memory as described previously in connection with FIG. 1. Hence, the term "global block" and/or "local block", when stored in memory in memory as block chain data, do not have to equate to a block size unit of memory. A global block and/or local block may be smaller, equivalent, and/or larger than a block size unit, e.g., denomination, associated with a particular memory architecture or design. Further, memory array 201 can be a secure array, as will be further described herein in connection with FIGS. 5A and 5B. Although one memory array 201 is illustrated in FIG. 2A, memory 216 can include any number of memory arrays analogous to memory array 201.

As illustrated in FIG. 2A, host 202 can be coupled to the memory device 206 via interface 204. Host 202 and memory device 206 can communicate (e.g., send commands and/or data such as block chain data 220) on interface 204. Host 202 and/or memory device 206 can be, or be part of, a laptop computer, personal computer, digital camera, digital recording and playback device, mobile telephone, PDA, memory card reader, interface hub, or Internet of Things (IoT) enabled device, such as, for instance, an automotive (e.g., vehicular and/or transportation infrastructure) IoT enabled device or a medical (e.g., implantable and/or health monitoring) IoT enabled device, among other host systems, and can include a memory access device (e.g., a processor). One of ordinary skill in the art will appreciate that "a processor" can intend one or more processors, such as a parallel processing system, a number of coprocessors, etc.

Interface 204 can be in the form of a standardized physical interface. For example, when memory device 206 is used for information storage in computing system 200, interface 204 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. Interface 204 can provide an interface for passing control, address, information (e.g., data), and other signals between memory device 206 and a host (e.g., host 202) having compatible receptors for interface 204.

Memory device 206 includes controller 208 to communicate with host 202 and with memory 216 (e.g., memory array 201). For instance, controller 208 can send commands to perform operations on memory array 201, including operations to sense (e.g., read), program (e.g., write), move, and/or erase data (e.g., "local" and/or "global" block chain data), among other operations. Again, the intended meaning of the terms "global block" and/or "local block" for block chain data in block chain technology and systems are defined in connection with FIGS. 3 and 4.

Controller 208 can be included on the same physical device (e.g., the same die) as memory 216. Alternatively, controller 208 can be included on a separate physical device that is communicatively coupled to the physical device that includes memory 216. In an embodiment, components of controller 208 can be spread across multiple physical devices (e.g., some components on the same die as the memory, and some components on a different die, module, or board) as a distributed controller.

Host 202 can include a host controller (not shown FIG. 2) to communicate with memory device 206. The host controller can send commands to memory device 206 via interface 204. The host controller can communicate with memory device 206 and/or the controller 208 on the memory device 206 to read, write, and/or erase data (e.g., "local" and/or "global" block chain data), among other operations. Further, in an embodiment, host 202 can be an IoT enabled device, as previously described herein, having IoT communication capabilities.

Figure 3:
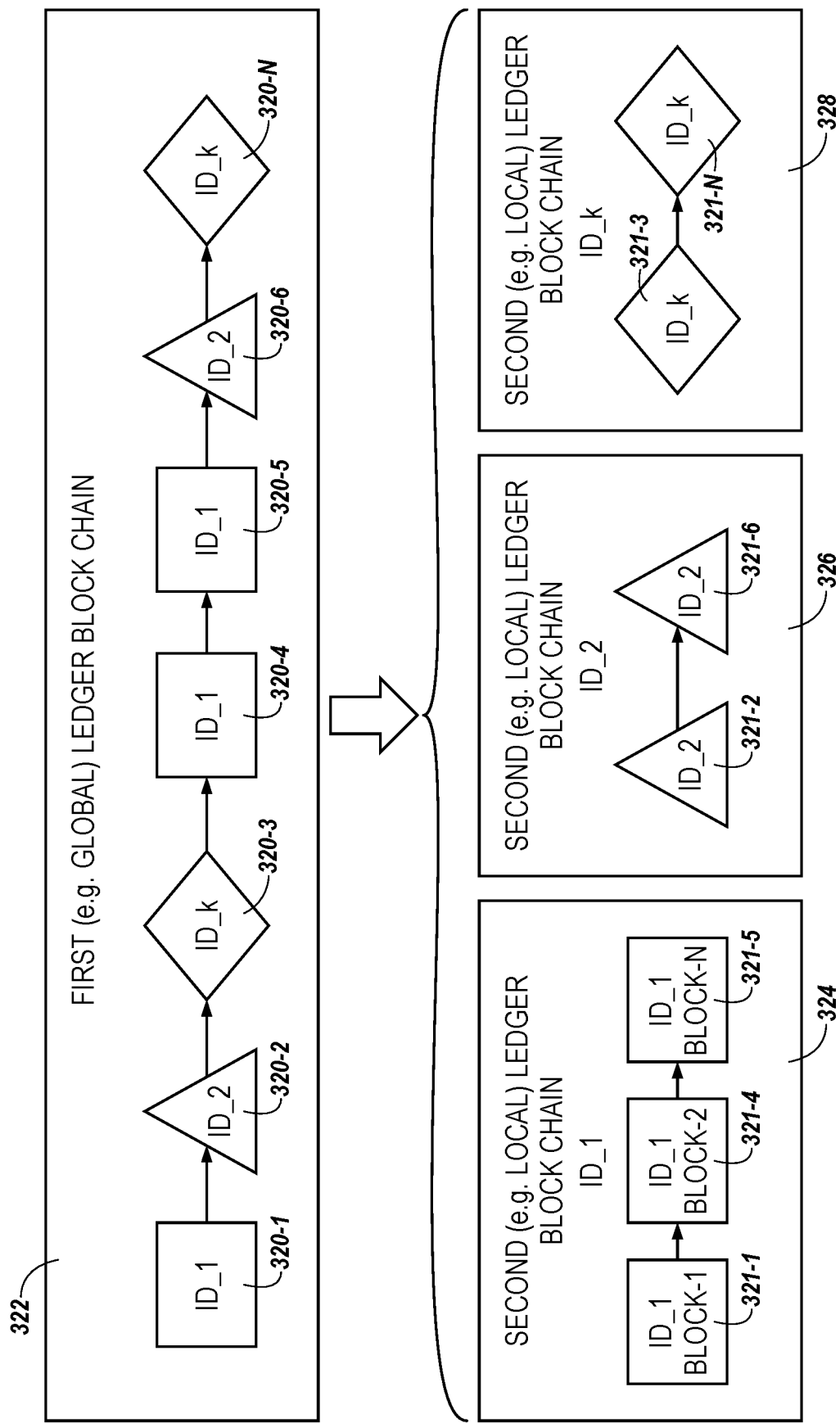
FIG. 3 illustrates an example of an exchange between a global ledger block chain and local ledger block chains as can be operated upon by circuitry and stored in a memory for secure updates stored in memory in accordance with an embodiment of the present disclosure.
Figure 4:
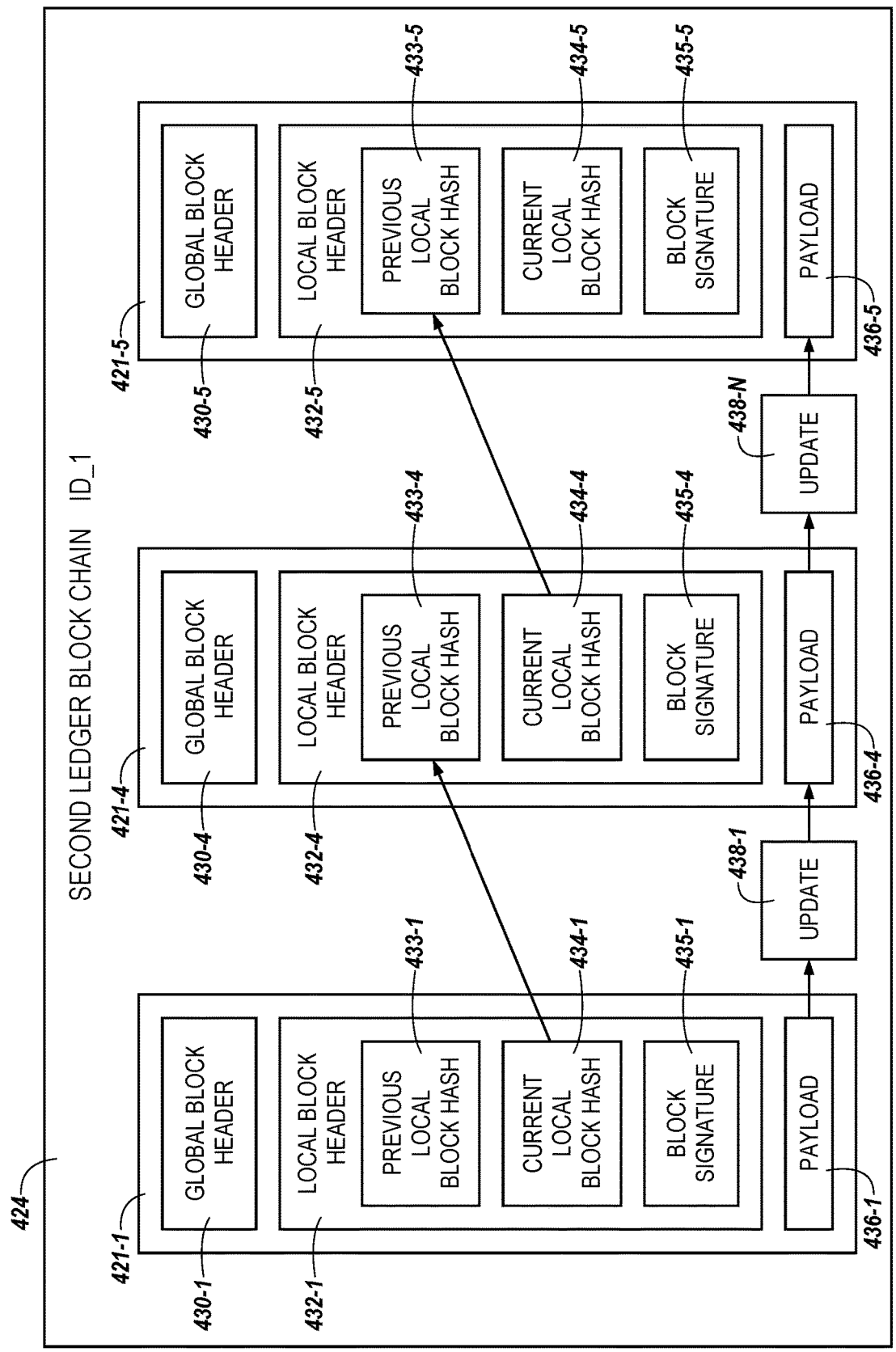
FIG. 4 illustrates an example of a local ledger block chain for secure updates stored in memory in accordance with an embodiment of the present disclosure.

Controller 208 on memory device 206 and/or the host controller on host 202 can include control circuitry and/or logic (e.g., hardware and firmware) configured to perform the block chain operations described herein, e.g., in connection with FIGS. 3 and 4, according to, for example DICE-RIoT architecture and/or protocol. In an embodiment, controller 208 on memory device 206 and/or the host controller on host 202 can be an application specific integrated circuit (ASIC) coupled to a printed circuit board including a physical interface. Also, memory device 206 and/or host 202 can include a buffer of volatile and/or non-volatile memory and a number of registers.

For example, as shown in FIG. 2A, memory device can include circuitry 210. In the embodiment illustrated in FIG. 2A, circuitry 210 is included in controller 208. However, embodiments of the present disclosure are not so limited. For instance, in an embodiment, circuitry 210 may be included in (e.g., on the same die as) memory 216 (e.g., instead of in controller 208). Circuitry 210 can comprise, hardware, firmware, and/or communicate instructions to a processing resource to perform the block chain operations described herein, e.g., in connection with FIGS. 3 and 4 using encryption techniques explained in FIGS. 6-11, according to, for example DICE-RIoT architecture and/or protocol.

For example, circuitry 210 can be configured to receive a global block of block chain data (defined in FIGS. 3 and 4) to be added as a local block of block chain data, e.g., 220, on a local ledger block chain (also defined in FIGS. 3 and 4) within an array 201 in memory 216. For example, a local block of block chain data, e.g., 220, may be a validated received global block of block chain data and may be generated and/or added to the local ledger block chain (shown in FIGS. 3 and 4) for validating (e.g., authenticating and/or attesting) an update to data stored in memory 216 (e.g., in memory array 201). The global block to be added as a local block in the local ledger block chain can include multiple headers. In an embodiment, a subset of array 201, or the whole array 201 can be a secure array (e.g., an area of memory 216 to be kept under control). FIG. 2A illustrates a pair of registers 214-1 and 214-2 although embodiments are not so limited, and one or more registers could be used. For example, the data stored in memory array 201 can include sensitive (e.g., non-user) data, such as host firmware and/or code to be executed for sensitive applications. In such an embodiment, a pair of non-volatile registers can be used to define the secure array. For example, in the embodiment illustrated in FIG. 2A, circuitry 210 includes registers 214-1 and 214-2 that can be used to define the secure array. For instance, register 214-1 can define the address (e.g., the starting LBA of the data) of the secure array, and register 214-2 can define the size (e.g., the ending LBA of the data) of the secure array. An example of such registers, and their use in defining a secure array, will be further described herein in connection with FIGS. 5A-5B).

Once the secure array has been defined, circuitry 210 can be used to generate (e.g., calculate) a cryptographic hash associated with the secure array, which may be referred to herein as a golden hash, using authenticated and antireplay protected commands (e.g., so that only memory device 206 knows the golden hash, and only memory device 206 is capable of generating and updating it). The golden hash may be stored in inaccessible portion of memory array 201 (e.g., the same inaccessible portion in which block chain data 220 and the local ledger block chain is stored) and can be used during the process of validating the data of the secure array.

In one example embodiment, memory device 206 (e.g., using circuitry 210) can send, via interface 204, the block chain data 220 (which may be a received global block from the global ledger block chain), along with the digital signature associated with block chain data 220, to the host 202 for validation of the update (e.g., the payload of the block chain data) before updating data stored in memory array 201. For example, circuitry 210 can sense (e.g., read) the block chain data 220 received and stored in memory array 201, and send the sensed block chain data 220 to host 202 for validation of the update to the data stored in array 201, responsive to a powering (e.g., a powering on and/or powering up) of memory device 206. As such, a validation of the update to the data stored in memory array 201 can be initiated (e.g., automatically) upon the powering of memory device 206.

As an additional example, circuitry 210 can send the block chain data 220, along with the digital signature associated with block chain data 220, to host 202 upon an external entity, such as host 202, initiating a validation of an update to the data stored in memory array 201. For instance, host 202 can send a command to memory device 206 (e.g., circuitry 210) to sense the block chain data 220, and circuitry 210 can operate on the command to sense the block chain data 220 and send the sensed block chain data 220 to host 202 for validation of the data stored in array 201, responsive to receipt of the command.

Upon receiving the block chain data 220, host 202 can validate (e.g., determine whether to validate) the data stored in memory array 201 using the received block (e.g., the payload of the received global block). For example, as will be explained further in connection with FIGS. 3 and 4, host 202 can use the cryptographic hash of the previous block in the block chain and the cryptographic hash of the data stored in memory array 201 to validate the data. Further, host 202 can validate the digital signature associated with the block chain data 220 to determine the local block is included (e.g., is eligible to be included) in the local ledger block chain. As used herein, validating the update to the data stored in memory array 201 can include, and/or refer to, authenticating and/or attesting that the update is genuine (e.g., is the same as originally programmed), and has not been altered by hacking activity, frequently provided by a hacker, or other including unauthorized changes.

In embodiments in which memory array 201 is a secure array, a golden hash, as described further in connection with FIGS. 3 and 4, may also be used to validate the update to the data stored in memory array 201. For example, a run-time cryptographic hash can be generated (e.g., calculated), and compared with the golden hash. If the comparison indicates the run-time and golden hashes match, it can be determined that the secure array has not been altered, and therefore the data stored therein is valid. If, however, the comparison indicates the run-time and golden hashes do not match, this may indicate that the data stored in the secure array has been changed (e.g., due to a hacker or a fault in the memory), and this can be reported to host 202.

In one example embodiment, in addition to the validation of the data stored in memory array 201, circuitry 210 can validate the block chain data 220 (e.g., the received global block from the global ledger block chain) to determine if the block chain data 220 is from an authorized entity (e.g., a known entity), and that the hash indicated on the received block chain data 220 matches the most recent local block of block chain data on the local ledger block chain. In response to the validation of the block chain data 220, the circuitry 210 can be configured to provide the update included in the block chain data 220 to augment, modify, and/or replace code (or a portion of code) stored in the secure array.

As will be explained further in connection with FIGS. 3 and 4, after the validation of the block chain data 220 serving as a local block in a local ledger block chain stored in memory array 201, circuitry 210 can generate an additional (e.g., the next) local block (e.g., receive the next global block form the global ledger block chain) to be added to the local ledger block chain for updating the data stored in memory array 201, in a manner analogous to which the previous block chain data 220 was generated/received. For example, this additional local block of block chain data 220 can include a cryptographic hash of the previous block in the local ledger block chain, and a new cryptographic hash of a new update to the data stored in memory array 201. Further, this additional local block can include a header having a timestamp indicating when this block was generated (e.g., received as an additional global block), and can have a digital signature associated therewith that indicates this additional local block is from an authorized entity and may be included in the local ledger block chain. An example illustrating such an additional local block will be further described herein (e.g., in connection with FIG. 3). Further, in embodiments in which memory array 201 is a secure array, an additional (e.g., new) golden hash can be generated.

The additional local block of block chain data, as well as the digital signature associated with the additional local block, and the additional golden hash, can be stored in memory array 201 as part of the local ledger block chain. For example, the additional local block can replace the block chain data 220 (e.g., the previous block chain data 220) in memory array 201. The additional block chain data, digital signature, and additional golden hash can then be used by host 202 to validate the update (e.g., the payload) to the data stored in memory array 201, in a manner analogous to that previously described herein for block chain data 220. Additional local blocks in the local ledger block chain can continue to be generated by circuitry 210 when they are received as global blocks, validated by the host 202, and used by host 202 to validate the update to the data stored in memory array 201, in such manner throughout the lifetime of memory device 206.

The embodiment illustrated in FIG. 2A can include additional circuitry, logic, and/or components not illustrated so as not to obscure embodiments of the present disclosure. For example, memory device 206 can include address circuitry to latch address signals provided over I/O connectors through I/O circuitry. Address signals can be received and decoded by a row decoder and a column decoder, to access memory array 201. Further, memory device 206 can include a main memory, such as, for instance, a DRAM or SDRAM, that is separate from and/or in addition to memory array 201. An example further illustrating additional circuitry, logic, and/or components of memory device 206 will be further described herein (e.g., in connection with FIG. 11).

Figure 2B:
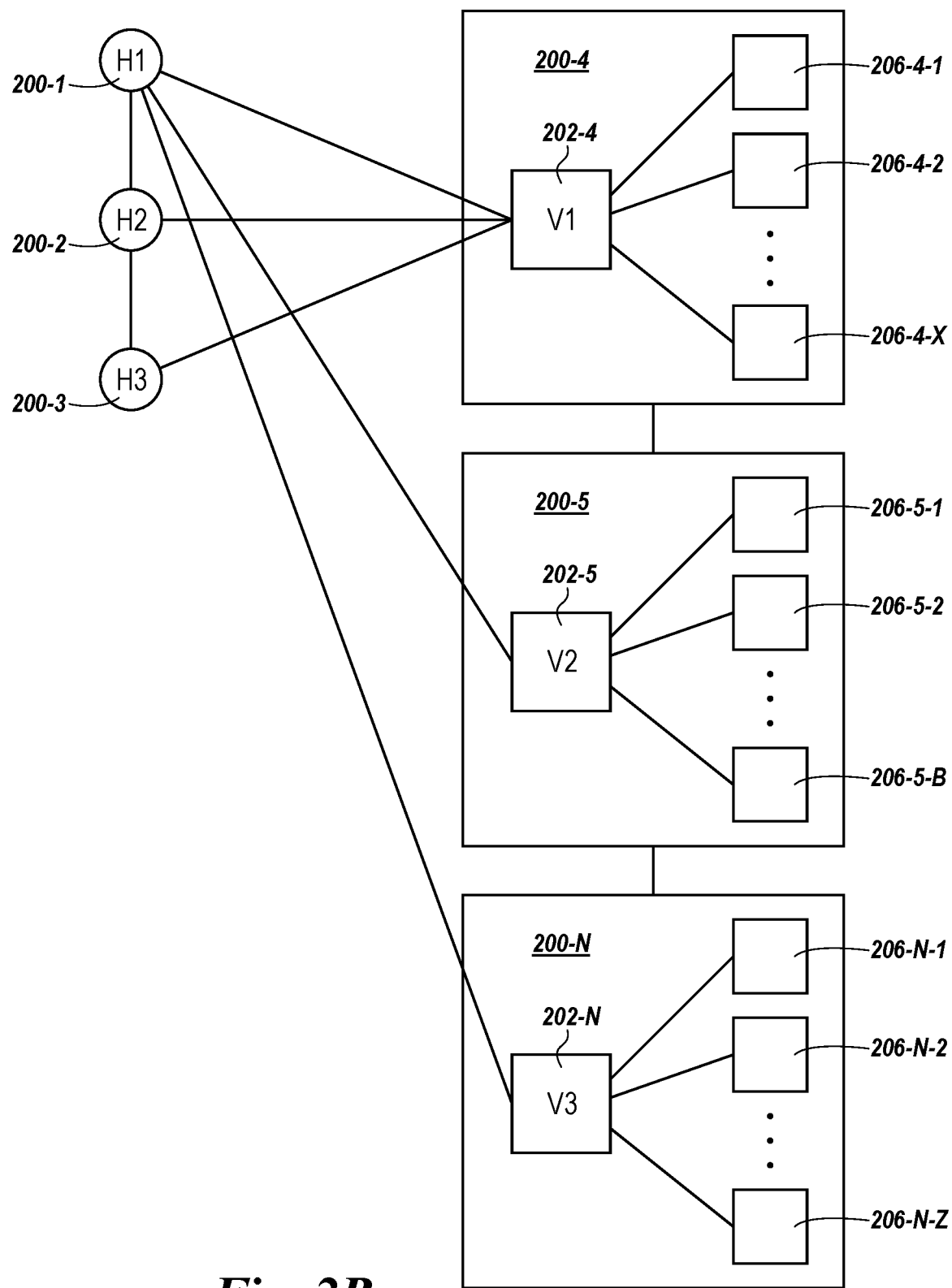
FIG. 2B is a block diagram of a network of computing systems which can include many computing nodes in a public and/or private network connected in a wired and/or wireless manner using wireless protocols such as peer to peer to peer and Internet Protocol (IP) in accordance with an embodiment of the present disclosure.

FIG. 2B is a block diagram of a network of computing systems which can include many computing nodes in a public and/or private distributed network, such as a peer to peer network, connected in a wired and/or wireless manner using wireless protocols and Internet Protocol (IP) in accordance with an embodiment of the present disclosure. In the example of FIG. 2B, multiple nodes, 200-1, 200-2, 200-3, . . . , 200-N, are shown connected in a network such as a peer to peer network. The network can support a distributed ledger technology (DLT) such as "block chain" technology. A distributed ledger is a database that is spread over several nodes or computing devices.

A "block chain" is a continuously growing, encrypted list of records. Block chain is one form of a DLT in which multiple nodes, 200-1, 200-2, 200-3, . . . , 200-N, can share and store the distributed list of records in a peer to peer network manner. As described herein a "block" in block chain is collection of information, e.g., data, headers, transactions, encryption, etc. A block may be added to the growing list of records in the block ledger if it is validated. Blocks are added to the block chain ledger in chronological order.

Hence, in the example of FIG. 2B, a given node, 200-1 (H1), 200-2 (H2), 200-3 (H3), . . . , 200-N, may maintain a copy of a current list or records in ledger. The multiple nodes, 200-1, 200-2, 200-3, . . . , 200-N, may each represent a different host, e.g., computing device with processing resources. Fore ease of illustration the hosts or multiple nodes, 200-1, 200-2, 200-3, . . . , 200-N, may be considered in relation to a block chain for autonomous and/or non-autonomous transportation vehicles, cars, buses, emergency vehicles, etc. Embodiments, however, are not limited to this example.

In this example, a vehicle manufacturer's servers may represent one node, e.g., 200-1, on the network of nodes, 200-1, 200-2, 200-3, . . . , 200-N, shown in FIG. 2B. A certified repair facility such as a dealership repair shop may represent another node, e.g., 200-2. Node 200-3 may be another host, e.g., another computing device, connected to the peer to peer network via the Internet and/or other wireless connections.

The manufacturer associated with node 200-1 may maintain a "first block chain ledger" having chronologically linked blocks of data related to a particular subject matter associated with node 200-1, e.g., maintain a first block chain ledger for all the vehicles produced by that manufacturer. For ease of illustration, and not by way of limitation, the referenced "first block chain ledger", having chronologically linked blocks of data related to a particular subject matter associate with a particular node, e.g., for all the vehicles produced by a given vehicle manufacturer, may also be referred to herein as a "global block chain ledger" (or, "global ledger block chain"). The manufacturer can distribute the first block chain ledger ("global ledger block chain") to other nodes, 200-2, 200-3, etc., in the peer to peer network and to its vehicles, connected as nodes to the network, in a wired and/or wireless manner. Various wireless communication technologies can be utilized in communicating with different nodes, 200-1, 200-2, 200-3, . . . , 200-N. For example, different generations of broadband mobile telecommunication technologies (e.g., first through fifth generation (1-5G)), device-to-device (e.g., vehicle to vehicle (v2v)), to communication including Bluetooth, Zigbee, and/or LTE device-to-device communication technologies, and/or other wireless communication utilizing an intermediary devices (e.g., WiFi utilizing an access point (AP)) may be utilized in communicating with different nodes.

In the example of FIG. 2B, node 200-4 may represent a particular vehicle belonging to a subset or class of vehicles manufactured by the particular manufacturer represented by node 200-1. In this example, node 200-5 may represent another particular vehicle, in the same or different subset or class of vehicles manufactured by the particular manufacturer or, alternatively, not be related to the manufacturer associated with node 200-1. Similarly, node 200-N may represent another particular vehicle, in the same or different subset or class of vehicles manufactured by the particular manufacturer or, alternatively, not be related to the manufacturer associated with node 200-1.

Each node may have its own processing resource, e.g., host connected to one or more memory devices such as illustrated in FIG. 2A. Thus, vehicle nodes 200-4, 200-5, and 200-N may each include a single and/or multiple host, e.g., processing resources, 202-4, 202-5, 202-N, respectively. Each host on a given vehicle node, 200-4, 200-5, and 200-N, may connect to multiple memory devices on each vehicle. For example, memory devices 206-4-1, 206-4-2, 206-4-X may be associated with host 202-4 on node 200-4, memory devices 206-5-1, 206-5-2, and 206-5-B may be associated with host 202-5 on node 200-5, and memory devices 206-N-1, 206-N-2, and 206-N-Z may be associated with host 202-N on node 200-N.

In this example, node 200-1 may regularly send, e.g, distribute, to nodes 200-4, 200-5, . . . , and 200-N an updated copy of the continuously growing first, e.g. "global", block chain ledger (also referred to herein as "global ledger block chain") maintained by node 200-1 containing chronological blocks, e.g., data, related to the subject matter of all the vehicles produced by the manufacturer. According to block chain technology, node 200-1 may share a copy of the first, e.g., "global", ledger block chain with other nodes, 200-1, 200-2, 200-3, . . . , 200-N in the distributed network. However, not all of the "blocks" in the growing first, e.g., "global" ledger block chain maintained by node 200-1 and received to other particular nodes, 200-4, 200-5, . . . , 200-N, may be authentic and/or relevant to other particular nodes. For example, particular vehicles, e.g., nodes 200-4, 200-5, . . . , 200-N, may belong to a subset or sub-class of vehicles manufactured by the particular manufacturer associated with node 200-1, but only particular blocks in the first, e.g., "global", ledger block chain may relate to a particular node 200-4, 200-5, . . . , 200-N, e.g., particular vehicle, in that subset or sub-class of vehicles. As such, according to embodiments disclosed herein, a particular node, 200-4, 200-5, . . . , 200-N, may validate only those blocks authenticated and relevant to that node, 200-4, 200-5, . . . , 200-N.

According to example embodiments, a particular node, e.g., 200-4, may validate and add blocks, authenticated and relevant to the node, to a second block chain ledger which may be a subset of fewer that all of the blocks contained in the global ledger block chain received from node 200-1 to node 200-4. Node 200-4 may store the subset of the "global ledger block chain" as a "local block chain ledger" (also referred to herein as "local ledger block chain") on the respective node, 200-4, 200-5, . . . , 200-N. Node 200-4 may also share the local ledger block chain with other nodes. However, same is not required and the local ledger block chain is termed "local" in that it may remain "local" only to that particular node 200-4, e.g., the host and/or memory devices of a particular vehicle. Thus, for ease of illustration, the second block chain ledger ("local ledger block chain") may be referred to herein as a local ledger block chain. The node, e.g., 200-4, may receive many global blocks associated with other global ledger block chains, pertaining to various subject matter, via the network of nodes to which it is connected. However, the node, e.g., 200-4, may be selective as to which blocks it accepts add allows to be added to its local ledger block chain. As explained in greater detail in connection with FIGS. 3 and 4, embodiments of the present disclosure may use the encryption techniques described in FIGS. 6-11 to validate and add blocks relevant to a particular node, 200-4, 200-5, . . . , 200-N, and store and maintain those blocks on the particular node, 200-4, 200-5, . . . , 200-N, as a "local ledger block chain" data, e.g., as secure firmware updates to a particular vehicle. In one example, a single host (such as shown in FIG. 2A) or multiple host on a particular vehicle, e.g., nodes 200-4, 200-5, . . . , 200-N, can maintain a local ledger block chain. As an example, a single or multiple host can maintain a distributed ledger on the node according to techniques described in co-pending, co-filed U.S. application Ser. No. 16/362,792 entitled "USING MEMORY AS A BLOCK IN A BLOCK CHAIN". In this example, a firmware update relevant to a particular vehicle, e.g., node 200-4, 200-5, . . . , 200-N, may be validated and added to the "local ledger block chain" of the node, 200-4, 200-5, . . . , 200-N, or alternatively discarded.

FIG. 3 illustrates an example of an exchange between a global ledger block chain 322 and local ledger block chains 324, 326, and 328 as can be operated upon by circuitry and stored in a memory and/or secure array, e.g., by circuitry 210 and memory 216 in FIG. 2. In this example secure updates to data may be validated and stored in memory such as memory array 201 described in connection with FIG. 2. As used herein, block" according to block chain technology in a block chain ledger or system can include data (e.g., payload), headers, encryption, history, timestamps, etc. Again, a "block" in a block chain does not have to correlate to or equate to the size of a block of memory, as explained as a storage unit of memory in FIG. 1.

Further, as used herein, the term "global block" is a block in the first block ledger which in the example is maintained and shared across a larger system or network of entities. A "local block" is a block only in a local ledger block chain, maintained as a subset of data relevant to a particular node, e.g., 200-4, as a subset of particular subject matter relevant to a subset of vehicles or more specific class of entities within a system or network of entities, e.g., memory device 201 in FIG. 2A. Neither a global block or a local block chain have to equate to a block size of a particular memory architecture. A global block and/or local block may be smaller, equivalent, and/or larger than a block size denomination associated with a particular memory architecture or design.

In the example of FIG. 3, a first, e.g., global, ledger block chain 322 can be related to subject matter associated with node 200-1 in FIG. 2B. The global ledger block chain can include global blocks 320-1, 320-2, 320-3, 320-4, 320-5, 320-6, and 320-N. When operated upon by circuitry and logic described herein, the global blocks 320 can be validated and accepted into second, e.g., local, ledger block chains 324, 326, and 328, shown as local blocks 321-1, 321-2, 321-3, 321-4, 321-5, 321-6, and 321-N. Second, e.g., local, ledger block chains 324, 326, and 328 may be maintained by nodes, 200-4, 200-5, . . . , 200-N shown in FIG. 2B, respectively therein. Alternatively, if not validated to a local ledger block chain maintained on a particular node, e.g., nodes, 200-4, 200-5, . . . , 200-N shown in FIG. 2B, the respective global blocks of the global ledger block chain can be rejected therefrom.

For example, when global block chain data is received by a particular memory to be validated and stored as a local block within local ledger block chain, global block chain data has to be validated by circuitry and logic, e.g., circuitry 210 in FIG. 2A, before it becomes a local block within local ledger block chain. In the example of FIG. 3, global block 320-1 has been validated, e.g., by circuitry 210, to become local block 321-1 in local ledger block chain 324, global block 320-2 has been validated to become local block 321-2 in local ledger block chain 326, global block 320-3 has been validated to become local block 321-3 in local ledger block chain 328, global block 320-4 has been validated to become local block 321-4 in local ledger block chain 324, global block 320-5 has been validated to become local block 321-5 in local ledger block chain 324, global block 320-6 has been validated to become local block 321-6 in local ledger block chain 326, and global block 320-N has been validated to become local block 321-N in local ledger block chain 328.

In one example embodiment, the global blocks 320 can be received to a memory device, e.g., 201 in FIG. 2A, validated, and added (e.g., generated) to a local ledger block chain 324, 326, or 328, by using the circuitry 210 described in FIG. 2A. In the example of FIG. 3, global block 320-4 has been received and validated to become local block 321-4. Local block 321-4 can be added to the local ledger block chain 324 after local block 321-1 has been validated by the circuitry and logic described herein. As described further in connection with FIG. 4, local block 321-1 is used to validate global block 320-4 as an update of data stored in the memory. In this example, local block 321-4 can be accepted and stored as the next block in the local ledger block chain 324 after local block 321-1). The global ledger block chain 322 can include blocks in a block chain configuration, architecture, and/or protocol from multiple hosts (e.g., the host 202 described in connection with FIG. 2).

A host and/or memory may maintain, e.g., store, local ledger block chains 324, 326, 328 and include only the validated global blocks that are relevant to a particular host and/or memory. Global blocks 320 may include identifiers for a particular host and/or memory associated with the data included in the global block. For example, local ledger block chain 324 is shown associated with a particular host/memory identifier (ID_1). Thus, circuitry associated with this host/memory relationship will validate only related global blocks such that local ledger block chain 324 will include only local blocks 321-1 (global block 320-1 from global ledger block chain 320), local block 321-4 (global block 320-4 from global ledger block chain 320), and local block 321-5 (global block 320-5 from global ledger block chain 320). Local ledger block chain 326 is shown associated with another host and/or memory identifier (ID_2). Thus, circuitry associated with this host/memory relationship will validate only related global blocks such that local ledger block chain 326 will include local block 321-2 (global block 320-2 from global ledger block chain 320), and local block 321-6 (global block 320-6 from global ledger block chain 320). Local ledger block chain 328 is shown associated with another host and/or memory identifier (ID_k). Thus, circuitry associated with this host/memory relationship will validate only related global blocks such that local ledger block chain 328 will n include the local block 321-3 (global block 320-3 from global ledger block chain 320), and local block 321-N (global block 320-N from global ledger block chain).

Using a local ledger block chains (e.g., 324, 326, 328) to store appropriate block chain data as updates to the memory of a respective host and/or memory relationship (e.g., ID_1, ID_2, and ID_k) can provide secure updates to data stored in a given memory device (e.g., the memory device 206 of FIG. 2A) in association with a given host. As such, the circuitry and logic described herein allow for the exchange and organization shown in FIG. 3. For example, circuitry is configured to receive a global block e.g., 320-4 from a global ledger block chain 322 and determine whether the global block 320-4 is related to a particular host and/or memory relationship. If the global block 320-4 is related to the particular host and/or memory, e.g., a comparison of encrypted hash for respective identifiers (e.g., ID_1, ID_2, and ID_k) according to block chain techniques match, the circuitry may add the global block 320-4 to its local ledger block chain 324. Global block 320-4 of block chain data can include a payload of an update to data included in a secure array associated with the host and/or memory. The circuitry described herein, e.g., circuitry 210, may validate the global block 320-4 by checking, e.g., comparing, a cryptographic hash of a current local block e.g., 321-1 in the local ledger block chain 324 and a cryptographic hash of the data stored in the memory to be updated, contained in global block 320-4. The current local block 321-1 of the local ledger block chain 324 also has a digital signature associated therewith which is similarly compared to indicate whether the global block 320-4 is from an authorized entity (e.g., includes an identifier ID_1 evidencing that global block 320-4 is from an entity associated with the particular host and/or memory relationship including the local ledger block chain 324). As explained in connection with FIG. 4, if validated the current local block 321-1 will become the "previous" local block and global block 320-4 will become the then "current" local block 321-4 in the local ledger block chain 324. The contents of the local blocks 321 of the local ledger block chain 324 (e.g., and/or 326, 328) are described in detail in connection with FIG. 4.

An authorized entity may provide the global ledger block chain 322 as a public ledger which may be distributed to all and/or a portion of the hosts and/or memory that concur the global ledger block chain 322 to receive system updates (e.g., updates to: hardware, software, and/or configuration updates). For example, the global ledger block chain 322 may be generated and maintained by an entity which may provide services such as hardware updates, software updates, component configurations, alterations to code stored in memory, alterations to a portion of code stored in memory, etc. for multiple host devices and/or memory devices serviced by the entity. For example, the global ledger block chain 322 may be generated and monitored by a manufacturer of vehicles. Each of the global blocks 320 within the global ledger block chain 322 may include data for an update to be implemented to instructions stored in memory for a vehicles with a particular identifier. For instance, as illustrated by FIG. 3, the global blocks 320-1, 320-4, 320-5 correspond to host and/or memory ID_1, global blocks 320-2, 320-6, correspond to host and/or memory ID_2, and global blocks 320-3, 320-N correspond to host and/or memory ID_k. Where the different ID's correspond to a different host and/or memory relationship (e.g., different vehicles).

In this instance, the vehicle manufacture generates and monitors the global ledger block chain 322 such that each instance of an update generated for particular vehicles (e.g., or a particular subset of vehicles sharing the identifier) is recorded as an immutable record in the global ledger block chain 322. For example, global block 320-1 includes an update for a vehicle (e.g., or data in the memory associated with the vehicle) associate with ID_1, global block 320-2 includes an update for vehicles associated with ID_2 and so on. The global blocks 320 are assembled in sequential order as they are produced by the vehicle manufacture and each global block 320 can include a digital signature indicating the vehicle manufacture where the block originated (e.g., the entity). In this way, the vehicle manufacture may keep an immutable record of all of the updates generated for the different vehicles monitored.

As used in block chain technology, and described more in connection with FIG. 4, the global blocks 320 in the global ledger block chain 322 can include multiple headers and encryption. For example, the global block of a global ledger block chain can include a global block header including a cryptographic hash data (e.g., a link to) to the previous global block and a hash including a cryptographic hash data to a previous local block. Thus, when the global block is received by the host 202 and/or memory device 206 in FIG. 2A, the global block to be added to the local ledger block chain can include a cryptographic hash (e.g., a link to) a current local block (e.g., in block chain data 220) in the local ledger block chain and a cryptographic hash of the update to data stored in the memory device 206 (e.g., a payload). The block chain data 220 in a local ledger block chain can also include a digital signature associated therewith that indicates that the global block is from an authorized entity.

Stated differently, a global block from a global ledger block chain may be received by the host and/or the memory, e.g., host 202 and/or memory 216 shown in FIG. 2A, and the circuitry and/or logic on the host and/or the memory may determine if the global block is related to the host and/or the memory. If so, the global block and its contents may be validated to become a new local block of block chain data stored in a local ledger block chain (e.g., as part of block chain data 220 stored on the array 201 of the memory 216 in FIG. 2A). The local block can also include a header having a timestamp indicating when the local block was generated/received.

The cryptographic hash of the data stored in a memory array, e.g., memory array 201 of FIG. 2A) to be updated, altered, configured, an/or otherwise changed by the data included in the received/generated local blocks, and/or the cryptographic hash of the previous local block in the local ledger block chain, can comprise, for instance, a SHA-256 cryptographic hash. Further, the cryptographic hash of the data stored in memory array, and the cryptographic hash of the previous local block in the local ledger block chain, can each respectively comprise 256 bytes of data.

The cryptographic hash of the data stored in memory array can be generated (e.g., calculated), by circuitry, e.g., circuitry 210 in FIG. 2A. In such an example, the cryptographic hash of the data stored can be internally generated by memory device, e.g., memory device 206 in FIG. 2A, without having external data moving on a host/memory device interface, e.g., interface 204 in FIG. 2A. As an additional example, the cryptographic hash of the data can be communicated from an external entity. For instance, a host can generate the cryptographic hash of the data stored in a memory array and send the generated cryptographic hash to a memory device e.g., circuitry of the memory device can receive the cryptographic hash of the data stored in memory array from host.

Further, a digital signature associated with a local block can be generated (e.g., calculated), by circuitry based on (e.g., responsive to) an external command, such as a command received from a host. The digital signature can be generated using symmetric or asymmetric cryptography. The digital signature may include a freshness field in the form of the previous local block on the global ledger block chain (which should match the current local block on the local ledger block chain when the block is added). As an additional example, a host can generate the digital signature, and send (e.g. provide) the generated digital signature to a memory device.

The freshness field, described herein, may change with each global block that is added to the local ledger block chain. Accordingly, the freshness field may be used to validate the incoming global block is the correct block to be added as the next block in the local ledger block chain. The incoming global block is verified to be the next local block to be added to the local ledger when the digital signature indicates that the incoming global block is related to the host, and the previous local block field (the freshness) of the incoming global block is the same as the current local block in the local ledger block chain. Because the freshness can also be used to calculate the digital signature, the digital signature can be different with each incoming global block.

As mentioned, the digital signature can be, for instance, a digital signature generated using asymmetric cryptography (e.g., based on a public and/or private key), and can comprise, for instance, an elliptical curve digital signature. As an additional example, the signature can be generated using symmetric cryptography (e.g., based on a unique secret key shared between a host and a memory device). The secret key can be exchanged by using any asymmetric protocol (e.g., the Diffie-Hellman protocol). In other examples, the key may be shared with a host in a secure environment (e.g., factory production, secure manufacturing, etc.). The generation and validation of the secret key is discussed further in connection with FIGS. 6-11.

As described in connection with FIG. 2, such block chain data 220 can be stored in a memory array, e.g., memory array 201 in FIG. 2A. The block chain data 220 can be stored in a portion of memory array 201 that is inaccessible to a user of memory device and/or host (e.g., in a "hidden" region of memory array). Storing a local block and/or local ledger block chain of block chain data in a particular memory array can simplify the storage of the local block by removing the need for software storage management for the local block.

In the example of FIG. 3, global block 320-6 can include a global header having a field for a hash of a previous global block 320-5, where the previous global block field indicates the preceding block in the global ledger block chain 322. A different hash in the global header can include a previous local block field, where the previous local block field indicates the preceding global block with an identifier of same host and/or memory ID.

For example, global block 320-6 may include a local block field with a hash for global block 320-2 (the previous related global block) because they are both vehicle ID_2. In this way, a particular host and/or memory device relationship (e.g., for a vehicles, or subset of vehicles) may receive multiple global blocks 320 from the global ledger block chain 322, and determine which global blocks 320 to accept as a local blocks and which global blocks 320 to discard.

For example, the local ledger block chain 324 may be included in a memory device and/or memory associated with a particular host through an identifier in the form of a host (e.g., a vehicle) with ID_1. The circuitry as described herein can be configured to store global blocks 320 in the memory associated with the host vehicle as part of the local ledger block chain 324. In other words, the circuitry is configured to receive multiple global blocks 320 from the global ledger block chain 322, and when the circuitry determines that the global block(s) 320 belong to the host vehicle associated with vehicle ID_1, they are accepted as local blocks 321 and added to the local ledger block chain 324.

Specifically, in an example, a host vehicle and/or memory associated with the host vehicle with an ID_1 includes, e.g., may store, the local ledger block chain 324 and the circuitry and/or memory may receive multiple global blocks 320-1, 320-2, 320-3, 320-4, 320-5, 320-6, and 320-N from the global ledger block chain 322. The circuitry is configured to determine whether the multiple global blocks 320 received from the global ledger block chain 322, by the circuitry are related to the host vehicle and/or memory associated with the host vehicle ID_1. Thus, the circuitry may determine that the global blocks 320-1, 320-4, and 320-5 are related to the host vehicle ID_1, and the circuitry is configured to validate and, if validated, to sequentially add global blocks 320-1, 320-4, 320-5 of the multiple global blocks received from the global ledger block chain 322 to the local ledger block chain 324 as local blocks 321-1, 321-4, and 321-5 because it has been verified that they are related to the host vehicle ID_1.

In one example, the global blocks 320-1, 320-4, and 320-5 can be added (sequentially) to the local ledger block chain 324 when a previous local block field in each of the respective global blocks 320 matches a current local block field in the current local block of the local ledger block chain 324. Specifically, the circuitry can validate the incoming global block 320-4 by confirming that the global block 320-4 is from an authorized entity (e.g., the vehicle manufacture's global ledger block chain 322) and checking that the previous local block field of global block 320-4 is a hash for local block 321-1 (which is the same as the global block 320-1), and checking that the current local block 321-1 has a matching hash in its own current local block field. This procedure can be applied to add the global block 320-5 to the local ledger block chain 324. Thus, the global blocks 320-1, 320-4, and 320-5 can become local blocks 321-1, 321-4, and 321-5 in the local ledger block chain 324. Using this method and configuration, the local ledger block chain 324 includes multiple local blocks related to a host and/or memory associated with (ID_1) assembled in sequential order.

Additionally, the circuitry is configured to refrain from adding global blocks 320 to the local ledger block chain 324, when they are unrelated to the host and/or memory ID_1. Thus, the circuitry may determine that global blocks 320-2, 320-6, 320-3, and 320-N are not related to the host and/or memory ID_1 and may discard the unrelated global blocks from local ledger block chain 324. The mechanisms described in connection with FIG. 3 may be applied to multiple hosts and/or multiple memories e.g., local ledger block chain 326, and local ledger block chain 328.

For example, the circuitry may generate a local ledger block chain (e.g., 324) for validating an update to data stored in the memory (e.g., associated with ID_1) and receive global blocks (e.g., 320-1, 320-2, 320-3, 320-4, 320-5, 320-6, 320-N) from a global ledger block chain 322. The circuitry may add a first portion (e.g., 320-1, 320-4, 320-5) of the global blocks to the local ledger block chain 324 when a digital signature associated with each of the global blocks of the first portion is verified by the circuitry to be related to the host and/or memory (e.g., ID_1). The circuitry may discard a second portion (e.g., 320-2, 320-6, 320-3, 320-N) of the received global blocks when the second portion of the global blocks are determined to be unrelated to the host and/or memory associated with ID_1, (e.g., the second portion is associated with ID_2, and/or ID_k).

As is described further in connection with FIG. 4, a freshness field may be used by the circuitry to verify a global block belongs in the local ledger block chain (e.g., 324, 326, 328). In the example above, each of the global blocks of the first portion (e.g., 320-1, 320-4, 320-5) include a freshness field used to generate the digital signature. The freshness field for each of the global blocks of the first portion (e.g., 320-1, 320-4, 320-5) corresponds to a current local block of the local ledger block chain 324. As such, the global blocks of the first portion (e.g., 320-1, 320-4, 320-5) are added to the local ledger block chain 324 in sequential order (as local blocks 321-1, 321-4, and 321-5) and stored in the memory associated with the host.

Specifically, the circuitry can generate a digital signature based on a freshness field of the global block. For instance, the circuitry may generate the freshness field of global block 320-4 by identifying a previous local block field in the header of the global block 320-4 (in this instance, this would be a hash of global block 320-1 because it is the previous global block with the ID_1). Where the current local block 321-1 of the local ledger block chain 324 and the previous local block field (again, in this instance this would be global block 320-1) of the global block 320-4 of the global ledger block chain 322 are the same.

FIG. 4 illustrates an example of a local ledger block chain (e.g., local ledger block chain 424) for secure updates stored in memory (e.g. in memory array 201 previously described in connection with FIG. 2A) in accordance with an embodiment of the present disclosure. The local ledger block chain 424 can be similar to the local ledger block chain 324 described in connection with FIG. 3. For ease of illustration, FIG. 4 illustrates only local ledger block chain 424. However, examples described in connection with FIG. 4, and local ledger block chain 424, may also be applied for other local ledger block chains (e.g., local ledger block chains 326 and 328 described in connection with FIG. 3). Local ledger block chain 424 is a block chain used for secure updates of data stored in a memory of a respective host and/or memory exchange. As one example, the host and/or memory exchange is associated with a particular identifier, e.g., identifier ID_1.

In this example, the local blocks 421-1, 421-4, 421-5 of the local ledger block chain 424 are blocks that were received as, e.g., previously, global blocks 320-1, 320-4, 320-5 in the example of FIG. 3). In one example, circuitry 210 in FIG. 2 operates on the received global blocks using block chain encryption and decryption techniques described in connection with FIGS. 5A-11 to compare and validate respective a hash of the block chain data, e.g., using an SHA256 hash. When the global blocks are verified as being related to the host and/or memory (e.g., ID_1), they may become local blocks 421-1, 421-4, and 421-5 and be stored as an immutable record in the local ledger block chain 424 for the host and/or memory associated with ID_1. In this example, circuitry operates to compare a block chain hash for local block 421-4 (e.g., previously global block 320-4) to local block 421-1 (e.g., previously global block 320-1), for storage in the memory associated with the host ID_1. Once validated by the circuitry associated with the host and/or memory, the circuitry may link to the local block 421-1. Likewise local block 421-5 (e.g., previously global block 320-5) once validated by the circuitry associated with the host and/or memory may link to the local block 421-4.

In the example of FIG. 4, each local block (e.g., 421-1, 421-4, and/or 421-5 etc.) may respectively include the following information: a global block header, e.g., 430-1, 430-4, 430-5, and a local block header, e.g., 432-1, 432-4, 432-5. In this example, each local block header 432-1, 432-4, 432-5 includes a previous local block hash 433-1, 433-4, 433-5, a current local block hash 434-1, 434-4, 432-5, and a block signature 435-1, 435-4, 435-5. As shown in the example of FIG. 4, each local block, e.g., 421-1, 421-4, and 421-5, includes a payload, e.g., 436-1, 436-4, 436-5 as part of the block's information, e.g., data. As mentioned in connection with FIG. 3, each of the blocks (e.g., global and local) may include multiple headers (e.g., 430-1, 432-1) to link a current block to a previous block in their respective block chain ledgers (global or local).

For example, referring to the method of adding local block 421-4 to the local ledger block chain 424, the global block header 430-4 may include a freshness field in the form of a hash for a previous global block having the same associated ID_1 within the global ledger block chain, as well as a hash for the current global block (to link the global ledger block chain together). Put another way, when the global block (e.g., 320-4 of FIG. 3) is in a global ledger block chain (e.g., 322 of FIG. 3), the freshness field in the global block header is a hash for a previous global block (e.g., 320-1 of FIG. 3) having the same associated identifier (e.g., ID_1) in the global ledger block chain (e.g., 322 of FIG. 3). In this example, when local block 421-4 is being verified to be added to the local ledger block chain 424, the current local block hash 434-1 of the local block 421-1 in the local ledger block chain 424 will be the same as the freshness field in the global block header 430-4 when the circuitry validates the incoming global block (e.g., 320-4) to add it to the local ledger block chain 424 as local block 421-4. Put even another way, the freshness field of the of the global block header 430-4 should match the current local block hash 434-1 of the local block 421-1 of the local ledger block chain 424 because the current local block 421-1 was previously global block 320-1.

The local block headers e.g., 432-1, 432-4, and 432-5 each respectively include a previous local block hash e.g., 433-1, 433-4, and 433-5 (to link together the local ledger block chain 424), and a current local block hash e.g., 434-1, 434-4, and 434-5 (which is the same as an incoming global block freshness field), and block signatures e.g., 435-1, 435-4, 435-5 to indicate that the block is from an authorized entity (e.g., from a vehicle manufacturer and/or an entity associated with a host and/or memory) and related to the host and/or memory (e.g., ID_1). The payload e.g., 436-1, 436-4, and 436-5 can be data which includes a hardware, configuration, and/or software update (e.g., configuration, change in configuration, alteration to a device of the host and/or memory associated with the host, etc.) and and/or a cryptographic hash of the data stored in the memory to be updated.

For example, a host, in the form of a vehicle and/or memory associated with the vehicle having an identifier of ID_1, may include a memory and circuitry to generate a local ledger block chain 424 for validating an update to data stored in the memory. In this example, the local ledger block chain 424 is comprised of local block 421-4 (e.g., global block 320-4 of FIG. 3) taken from a global ledger block chain (e.g., 322 of FIG. 3). The local block 421-4 includes a current local block cryptographic hash 434-4 of the current local block 421-4. The current local block cryptographic hash 434-4 may be compared to a previous local block cryptographic hash 433.4 which was current local block hash 434-1, as a freshness field to validate an order (e.g., a sequence) and link the local ledger block chain 424 and a cryptographic hash of data stored in the memory to be updated (e.g., the payload 436-1, 436-4, and 436-5). The local block 421-4 of the local ledger block chain 424 has a digital signature 435-4 associated therewith that indicates the global block (e.g., 320-4 of FIG. 3) was from an authorized entity and was correctly added as the local block 421-4. In some examples, the authorized entity may be a manufacturer of the vehicles which is pushing updates to all vehicles produced by that manufacturer. In this way, the host and/or memory associated with ID_1 may check the block signature (e.g., 435-4) and may discard global blocks received from the global ledger block chain (e.g., the global ledger block chain 322) that are not related to the host and/or memory associated with ID_1.

The host and/or memory ID_1 can be configured to receive the local ledger block chain 424 from the memory, validate the update (e.g., the payload 436-1, 436-4, and 436-5) to the data stored in the memory using the received local ledger block chain 424. In this way, the host and/or memory associated with ID_1 can maintain and/or monitor each of the updates provided to the host and/or memory from the authorized entity. Because the assembly of the local ledger block chain 424 generates an immutable record, the circuitry may maintain control over what updates have taken place. This may prevent fraudulent updates, unintentional changes, unintentional error, and nefarious hacking attempts. Additionally, the maintenance of a local ledger block chain 424 on the memory associated with the host can provide a record of updates which may be produced upon demand. After a global block from the global ledger block chain (e.g., the global ledger block chain 322 of FIG. 3) has been validated and added to the local ledger block chain 424, the circuitry may implement the update included in the payload e.g., 436-1, 436-4, and 436-5.

For example, the local ledger block chain 424 may validate a global block (e.g., the global block 320-1 of FIG. 3) and add it to the local ledger block chain 424 as the local block 421-1. After the validation, the circuitry can execute the update 438-1 included in the payload 436-1 of the local block 421-1. The authorized entity may push another update to the host and/or memory associated with ID_1, as such, the circuitry may receive a second global block (e.g., the global block 320-4 of FIG. 3) which may be validated by the circuitry and added sequentially as local block 421-4, linked to local block 421-1. The circuitry may check and compare a cryptographic hash of a freshness field e.g., previous local block hash 433-4. If valid, this validation and linking in the local ledger block chain 424, the circuitry may execute the update 438-2 included in the payload 436-4 of local block 421-4. Using this method, the memory may continue to add global blocks as local blocks to the local ledger block chain 424 as described for local block 421-5, etc. In some examples, the host and/or memory associated with ID_1 may remove an older portion of the local ledger block chain 424 to create vacancy in the memory as the local ledger block chain 424 increases when more updates are generated by the authorized entity.

For example, the host and/or memory may be a computing device of a vehicle having an ID_1, and the local ledger block chain 424 can indicate updates to a software and/or hardware component on-board the vehicle. The computing device may include a threshold amount of immutable records that can be stored in the memory. In some examples, updates (e.g., 438-1, 438-2) are pushed from the authorized entity via global blocks to update a software and/or hardware component of the computing device, the circuitry may remove a local block (e.g., an older local block) from the local ledger block chain 424 when the local ledger block chain 424 has reached the threshold. The circuitry may remove an older local block (e.g., 421-1) to create vacancy in the memory of the computing device for a newer local block (e.g., 421-5) by executing firmware to alter the root (e.g., the root of the consensus, root of a Merkle tree, etc.) of the local ledger block chain 424. In this way, the circuitry can maintain control of the updates as the local ledger block chain 424 adds new local blocks.

Figure 5A:
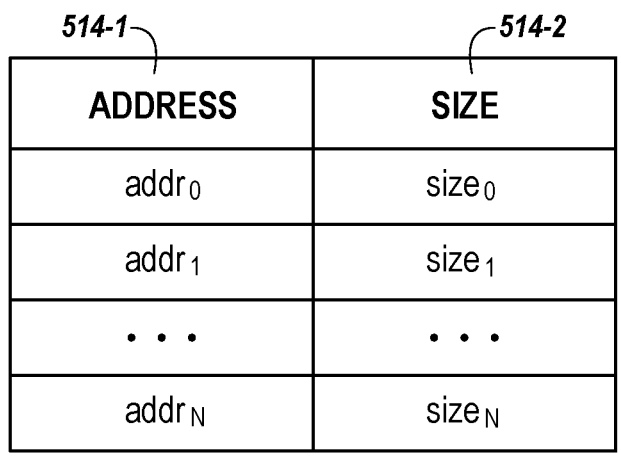
FIG. 5A illustrates an example of a pair of registers used to define a secure memory array in accordance with an embodiment of the present disclosure.
Figure 5B:
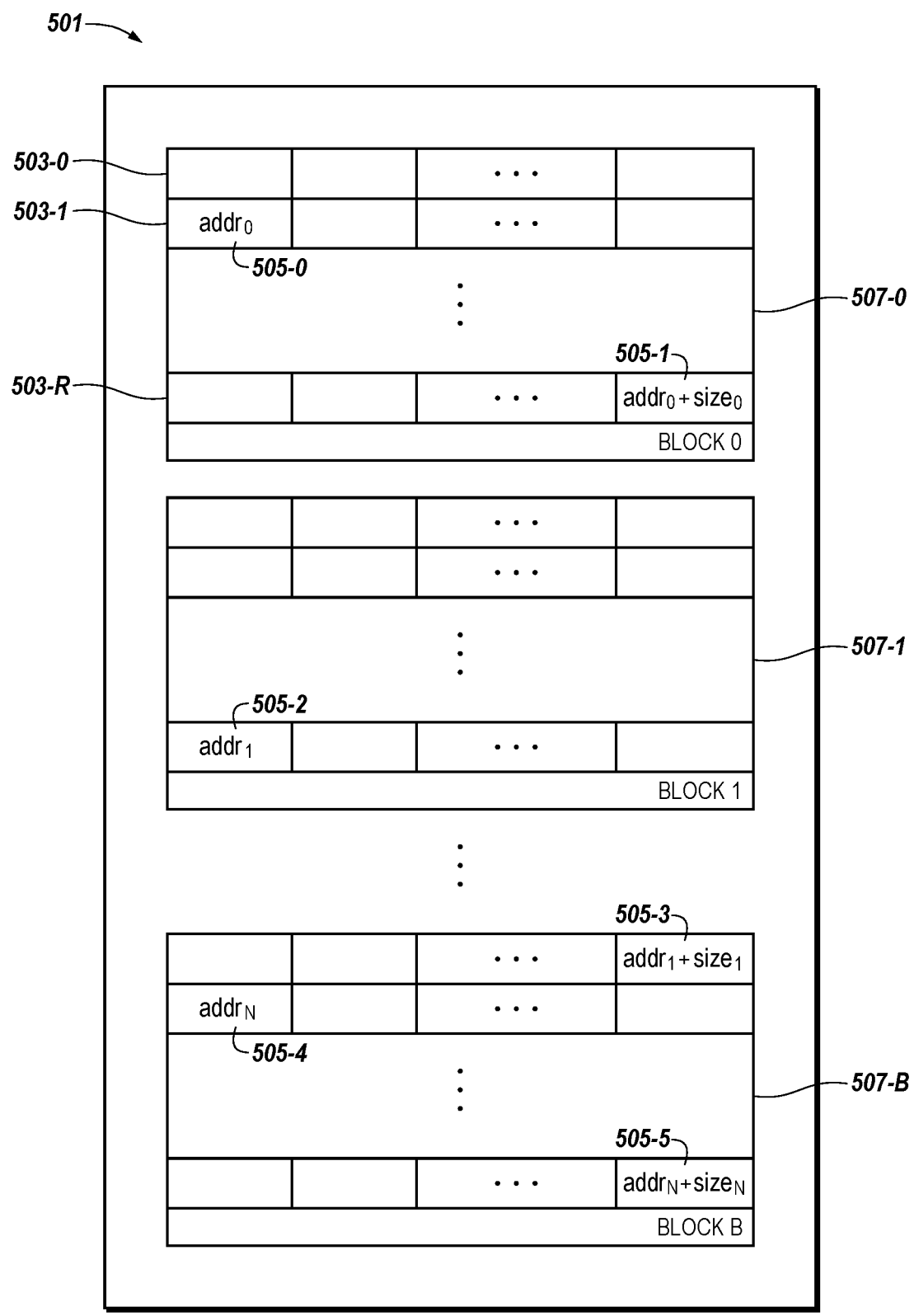
FIG. 5B illustrates a diagram of a portion of a memory array that includes a secure memory array defined in accordance with an embodiment of the present disclosure.

FIG. 5A illustrates an example of a pair of registers 514-1 and 514-2 used to define a secure memory array in accordance with an embodiment of the present disclosure, and FIG. 5B illustrates a diagram of a portion of a memory array 501 that includes a secure memory array defined using registers 514-1 and 514-2 in accordance with an embodiment of the present disclosure. Registers 514-1 and 514-2 can be, for instance, registers 214-1 and 214-2, respectively, previously described in connection with FIG. 2, and secure memory array 501 can be, for instance, memory array 201 previously described in connection with FIG. 2. For instance, as shown in FIG. 5B, secure memory array 501 can include a number of physical blocks 507-0, 507-1, . . . , 507-B of memory cells, each including a number of physical rows 503-0, 503-1, . . . , 503-R having a number of sectors of memory cells, in a manner analogous to memory array 101 previously described in connection with FIG. 1.

As shown in FIG. 5A, register 514-1 can define addresses of the secure array (e.g., the addresses of different portions of the secure array), and register 514-2 can define sizes of the secure array (e.g., the sizes of the different portions of the secure array). The addresses of the secure array defined by register 514-1 can correspond to, for instance, starting points (e.g., starting LBAs) of the secure array (e.g., the starting points of the different portions of the secure array), and the sizes of the secure array defined by register 514-2 can correspond to, for instance, ending points (e.g., ending LBAs) of the secure array (e.g., the ending points of the different portions of the secure array).

For example, as shown in FIG. 5A, registers 514-1 and 514-2 can define N pairs of values, with each respective pair comprising an address value (e.g., addr) defined by register 514-1 and a size value (e.g., size) defined by register 514-2. For instance, in the example illustrated in FIG. 5A, $Pair_0$ comprises address value $addr_0$ and size value $size_0$ (e.g., $Pair_0=[addr_0, size_0]$), $Pair_1$ comprises address value $addr_1$ and size value $size_1$ (e.g., $Pair_1=[addr_1, size_1]$), and so on, with $Pair_N$ comprising address value $addr_N$ and size value $size_N$ (e.g., $Pair_N=[addr_N, size_N]$). The address value of a pair can correspond to a starting point (e.g., starting LBA) of a portion of the secure array, and the sum of the address value and the size value of that pair can correspond to the ending point (e.g., ending LBA) of that portion of the secure array. As such, the entire secure array (e.g., the portions that comprise the entire secure array) can be given by: $[addr_0, addr_0+size_0] \cup [addr_1, addr_1+size_1] \cup \ldots \cup [addr_N, addr_N+size_N]$.

The first pair whose size value defined by register 514-2 is zero can stop the definition of the secure array. For instance, in the example illustrated in FIG. 5A, if the size value of $Pair_2$ is zero, then the secure array would be given by: $[addr_0, addr_0+size_0] \cup [addr_1, addr_1+size_1]$.

An example of a secure array defined by registers 514-1 and 514-2 (e.g., with all size values defined by register 514-2 as non-zero) is illustrated in FIG. 5B. For instance, as shown in FIG. 5B, the address (e.g., LBA) associated with sector 505-0 of memory array 501 is $addr_0$, the address associated with sector 505-1 of memory array 501 is $addr_0+size_0$, the address associated with sector 505-2 of memory array 501 is $addr_1$, the address associated with sector 505-3 of memory array 501 is $addr_1+size_1$, the address associated with sector 505-4 of memory array 501 is $addr_N$, and the address associated with sector 505-5 of memory array 501 is $addr_N+size_N$. As such, the secure array comprises sectors (e.g., the data stored in sectors) 505-0 through 505-1, sectors 505-2 through 505-3, and 505-4 through 505-5. However, the sectors of memory array 501 that are before sector 505-0, and sectors 505-1 through 505-2 of memory array 501, are not part of the secure array (e.g., the secure array comprises a subset of array 501).

Figure 6:
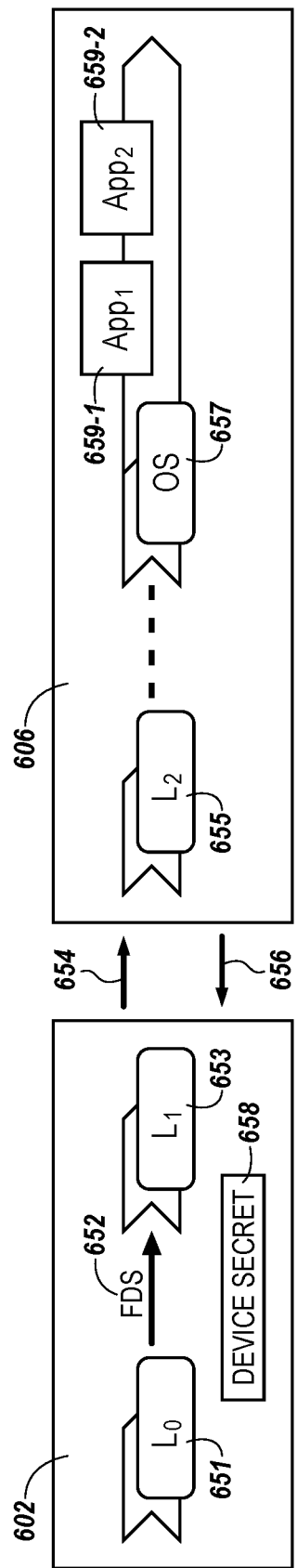
FIG. 6 is a block diagram of an example system including a host and a memory device in accordance with an embodiment of the present disclosure.

FIG. 6 is a block diagram of an example system including a host 602 and a memory device 606 in accordance with an embodiment of the present disclosure. Host 602 and memory device 606 can be, for example, host 202 and memory device 206, respectively, previously described in connection with FIG. 2.

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 6, Layer 0 ("$L_0$") 651 and Layer 1 ("$L_1$") 653 are within the host. Layer 0 651 can provide a Firmware Derivative Secret (FDS) key 652 to Layer 1 653. The FDS key 652 can describe the identity of code of Layer 1 653 and other security relevant data. In an example, a particular protocol (such as robust internet of things (RIOT) core protocol) can use the FDS 652 to validate code of Layer 1 653 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 658 can be used to create the FDS 652 and be stored in memory associated with the host 602.

The host can transmit data, as illustrated by arrow 654, to the memory device 606. The transmitted data can include an external identification that is public, a certificate (e.g., an external identification certificate), and/or an external public key. Layer 2 ("$L_2$") 655 of the memory device 606 can receive the transmitted data, and execute the data in operations of the operating system ("OS") 657 and on a first application 659-1 and a second application 659-2.

In an example operation, the host 602 can read the device secret 658, hash an identity of Layer 1 653, and perform a calculation including:

$$K_{L1}=KDF\ [Fs(s),\ \text{Hash ("immutable information")}]$$

where $K_{L1}$ is an external public key, KDF (e.g., KDF defined in the National Institute of Standards and Technology (NIST) Special Publication 800-108) is a key derivation function (e.g., HMAC-SHA256), and Fs(s) is the device secret 658. FDS 652 can be determined by performing:

$$FDS=HMAC\text{-}SHA256\ [Fs(s),\ SHA256(\text{"immutable information"})]$$

Likewise, the memory device 606 can transmit data, as illustrated by arrow 656, to the host 602.

Figure 7:
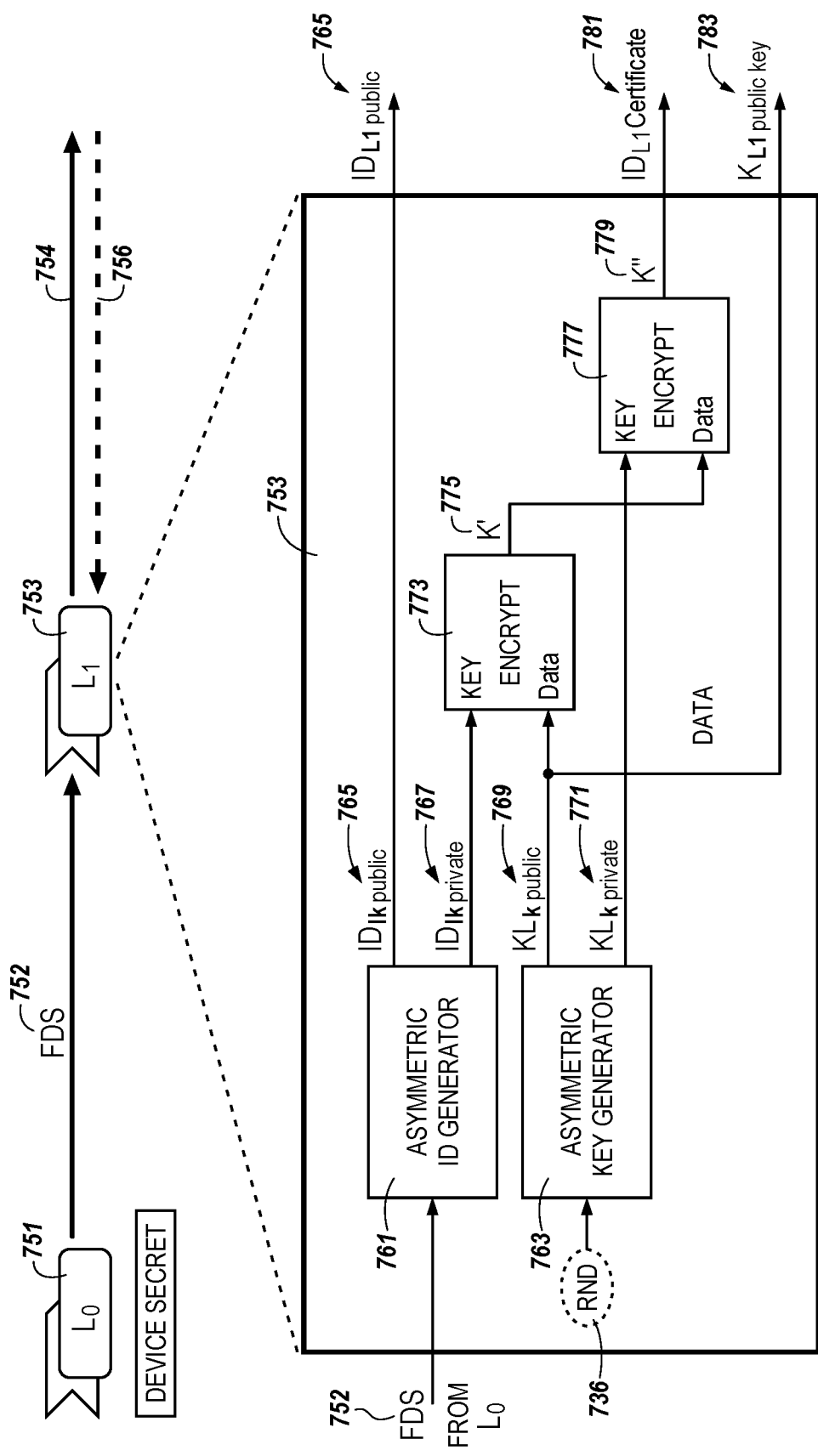
FIG. 7 is a block diagram of an example process to determine a number of parameters in accordance with an embodiment of the present disclosure.

FIG. 7 is a block diagram of an example process to determine a number of parameters in accordance with an embodiment of the present disclosure. FIG. 7 is an example of a determination of the parameters including the external public identification, the external certificate, and the external public key that are then sent, indicated by arrow 754, to Layer 2 (e.g., Layer 2 655) of a memory device (e.g., 606 in FIG. 6). Layer 0 ("$L_0$") 751 in FIG. 7 corresponds to Layer 0 651 in FIG. 6 and likewise FDS 752 corresponds to FDS 652, Layer 1 753 corresponds to Layer 1 653, and arrows 754 and 756 correspond to arrows 654 and 656, respectively.

The FDS 752 from Layer 0 751 is sent to Layer 1 753 and used by an asymmetric ID generator 761 to generate a public identification ("$ID_{lk\ public}$") 765 and a private identification 767. In the abbreviated "$ID_{lk\ public}$," the "lk" indicates Layer k (in this example Layer 1), and the "public" indicates that the identification is openly shared. The public identification 765 is illustrated as shared by the arrow extending to the right and outside of Layer 1 753 of the host. The generated private identification 767 is used as a key input into an encryptor 773. The encryptor 773 can be any processor, computing device, etc. used to encrypt data.

Layer 1 753 of a host can include an asymmetric key generator 763. In at least one example, a random number generator (RND) 736 can optionally input a random number into the asymmetric key generator 763. The asymmetric key generator 763 can generate a public key ("$K_{Lk\ public}$") 769 (referred to as an external public key) and a private key ("$K_{LK\ private}$") 771 (referred to as an external private key) associated with a host such as host 602 in FIG. 6. The external public key 769 can be an input (as "data") into the encryptor 773. The encryptor 773 can generate a result K'775 using the inputs of the external private identification 767 and the external public key 769. The external private key 771 and the result K'775 can be input into an additional encryptor 777, resulting in output K" 779. The output K" 779 is the external certificate ("$ID_{L1}$ certificate") 781 transmitted to the Layer 2 (655 of FIG. 6). The external certificate 781 can provide an ability to verify and/or authenticate an origin of data sent from a device. As an example, data sent from the host can be associated with an identity of the host by verifying the certificate, as will be described further in association with FIG. 9. Further, the external public key ("$K_{L1\ public\ key}$") 783 can be transmitted to Layer 2. Therefore, the public identification 765, the certificate 781, and the external public key 783 of a host can be transmitted to Layer 2 of a memory device.

Figure 8:
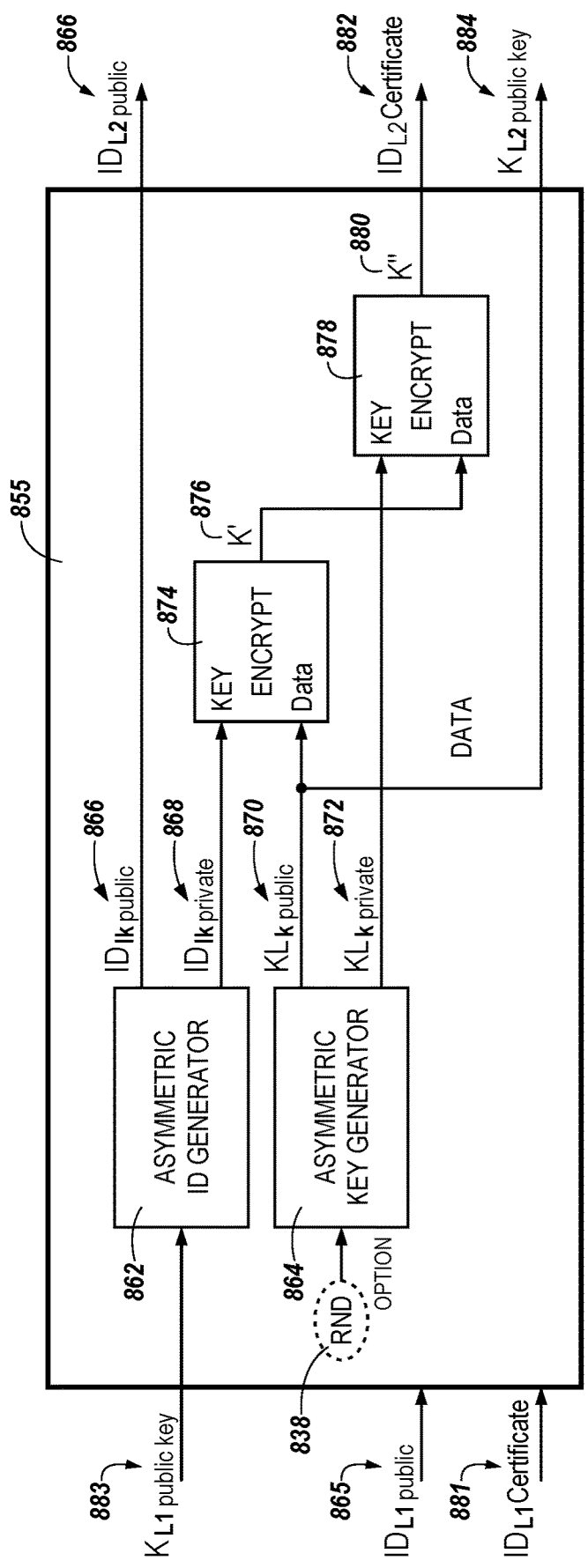
FIG. 8 is a block diagram of an example process to determine a number of parameters in accordance with an embodiment of the present disclosure.

FIG. 8 is a block diagram of an example process to determine a number of parameters in accordance with an embodiment of the present disclosure. FIG. 8 illustrates a Layer 2 855 of a memory device (e.g., memory device 606 in FIG. 6) generating a device identification ("$ID_{L2}$ public") 866, a device certificate ("$ID_{L2}$ Certificate") 882, and a device public key ("$K_{L2\ public\ key}$") 884.

The external public key ("$K_{L1\ public\ key}$") 883 transmitted from Layer 1 of the host to Layer 2 855 of a memory device, as described in FIG. 7, is used by an asymmetric ID generator 862 of the memory device to generate a public identification ("$ID_{lk\ public}$") 866 and a private identification 868 of the memory device. In the abbreviated "$ID_{lk\ public}$," the "lk" indicates Layer k (in this example Layer 2), and the "public" indicates that the identification is openly shared. The public identification 866 is illustrated as shared by the arrow extending to the right and outside Layer 2 855. The generated private identification 868 is used as a key input into an encryptor 874.

As shown in FIG. 8, the external certificate 881 and external identification 865, along with the external public key 883, are used by a certificate verifier 847. The certificate verifier 847 can verify the external certificate 881 received from a host (e.g., host 602), and determine, in response to the external certificate 881 being verified or not being verified, whether to accept or discard data received from the host. Further details of verifying the external certificate 881 is described in connection with FIG. 9.

Layer 2 855 of the memory device can include an asymmetric key generator 864. In at least one example, a random number generator (RND) 838 can optionally input a random number into the asymmetric key generator 864. The asymmetric key generator 864 can generate a public key ("$K_{Lk\ public}$") 870 (referred to as a device public key) and a private key ("$K_{LK\ private}$") 872 (referred to as a device private key) associated with a memory device such as memory device 606 in FIG. 6. The device public key 870 can be an input (as "data") into the encryptor 874. The encryptor 874 can generate a result K' 876 using the inputs of the device private identification 868 and the device public key 870. The device private key 872 and the result K' 876 can be input into an additional encryptor 878, resulting in output K" 880. The output K" 880 is the device certificate ("$ID_{L2}$ certificate") 882 transmitted back to the Layer 1 (653 of FIG. 6). The device certificate 882 can provide an ability to verify and/or authenticate an origin of data sent from a device. As an example, data sent from the memory device can be associated with an identity of the memory device by verifying the certificate, as will be described further in association with FIG. 9. Further, the device public key ("$K_{L2\ public\ key}$") 884 can be transmitted to Layer 1. Therefore, the public identification 866, the certificate 882, and the device public key 884 of the memory device can be transmitted to Layer 1 of a host.

In an example, in response to a host receiving a public key from a memory device, the host can encrypt data to be sent to the memory device using the device public key. Vice versa, the memory device can encrypt data to be sent to the host using the external public key. In response to the memory device receiving data encrypted using the device public key, the memory device can decrypt the data using its own device private key. Likewise, in response to the host receiving data encrypted using the external public key, the host can decrypt the data using its own external private key. As the device private key is not shared with another device outside the memory device and the external private key is not shared with another device outside the host, the data sent to the memory device and the host remains secure.

Figure 9:
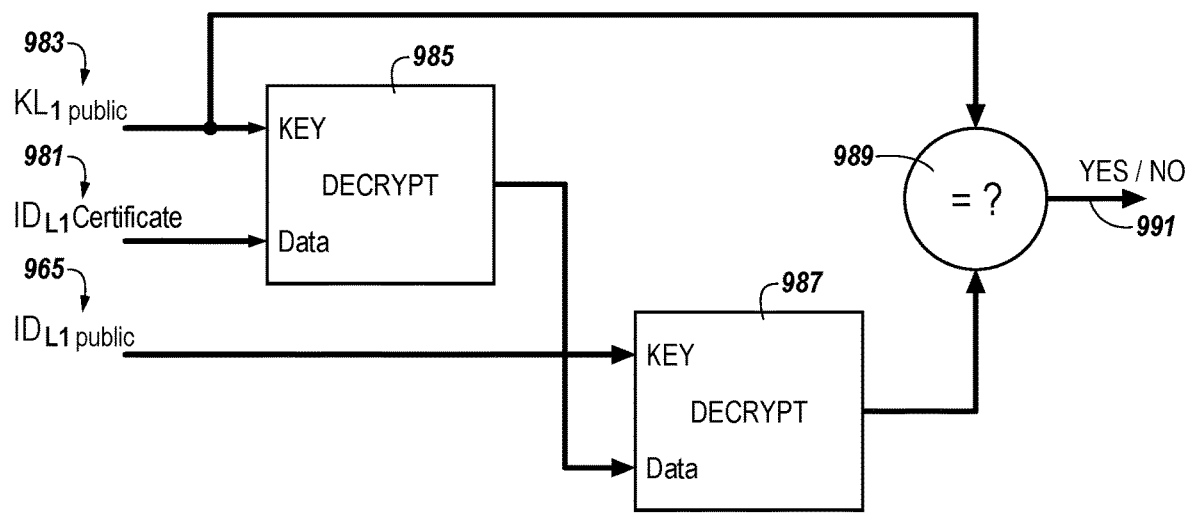
FIG. 9 is a block diagram of an example process to verify a certificate in accordance with an embodiment of the present disclosure.

FIG. 9 is a block diagram of an example process to verify a certificate in accordance with an embodiment of the present disclosure. In the illustrated example of FIG. 9, a public key 983, a certificate 981, and a public identification 965 is provided from a host (e.g., from Layer 1 653 of host 602 in FIG. 6). The data of the certificate 981 and the external public key 983 can be used as inputs into a decryptor 985. The decryptor 985 can be any processor, computing device, etc used to decrypt data. The result of the decryption of the certificate 981 and the external public key 983 can be used as an input into a secondary decryptor 987 along with the public identification, result in an output. The external public key 983 and the output from the decryptor 987 can indicate, as illustrated at 989, whether the certificate is verified by a comparison, resulting in a yes or no 991 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 10:
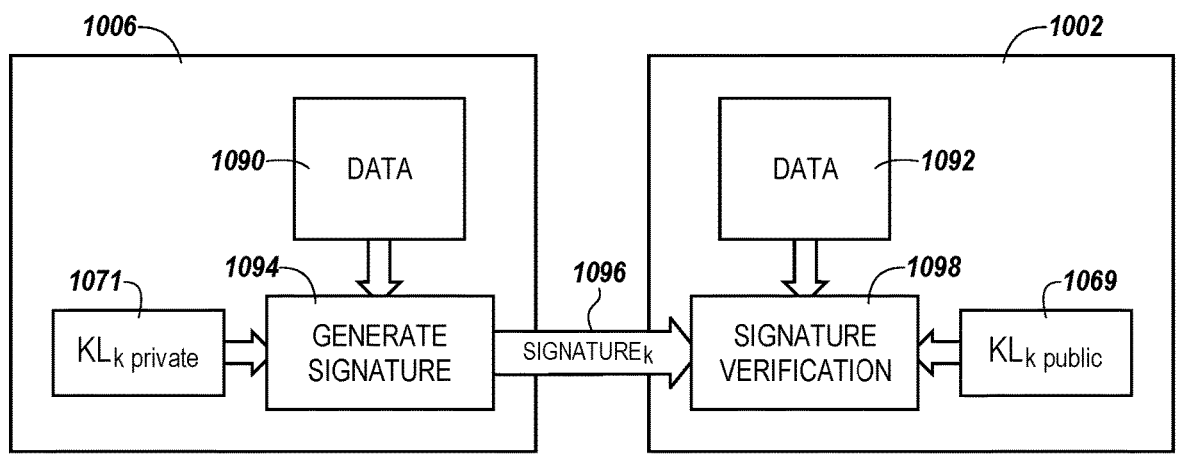
FIG. 10 is a block diagram of an example process to verify a signature in accordance with an embodiment of the present disclosure.

FIG. 10 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A memory device 1006 (such as memory device 206 in FIG. 2) can send data 1090 to a host (such as host 202 in FIG. 2). The memory device 1006 can generate, at 1094, a signature 1096 using a device private key 1071. The signature 1096 can be transmitted to the host 1002. The host 1002 can verify, at 1098, the signature using data 1092 and the external public key 1069 previously received. In this way, the signature is generated using a private key and verified using a public key. In this way, the private key used to generate a unique signature can remain private to the device sending the signature while allowing the receiving device to be able to decrypt the signature using the public key of the sending device for verification. This is in contrast to encryption/decryption of the data, which is encrypted by the sending device using the public key of the receiving device and decrypted by the receiving device using the private key of the receiver. In at least one example, the device can verify the digital signature by using an internal cryptography process (e.g., Elliptical Curve Digital signature (ECDSA) or a similar process.

Figure 11:
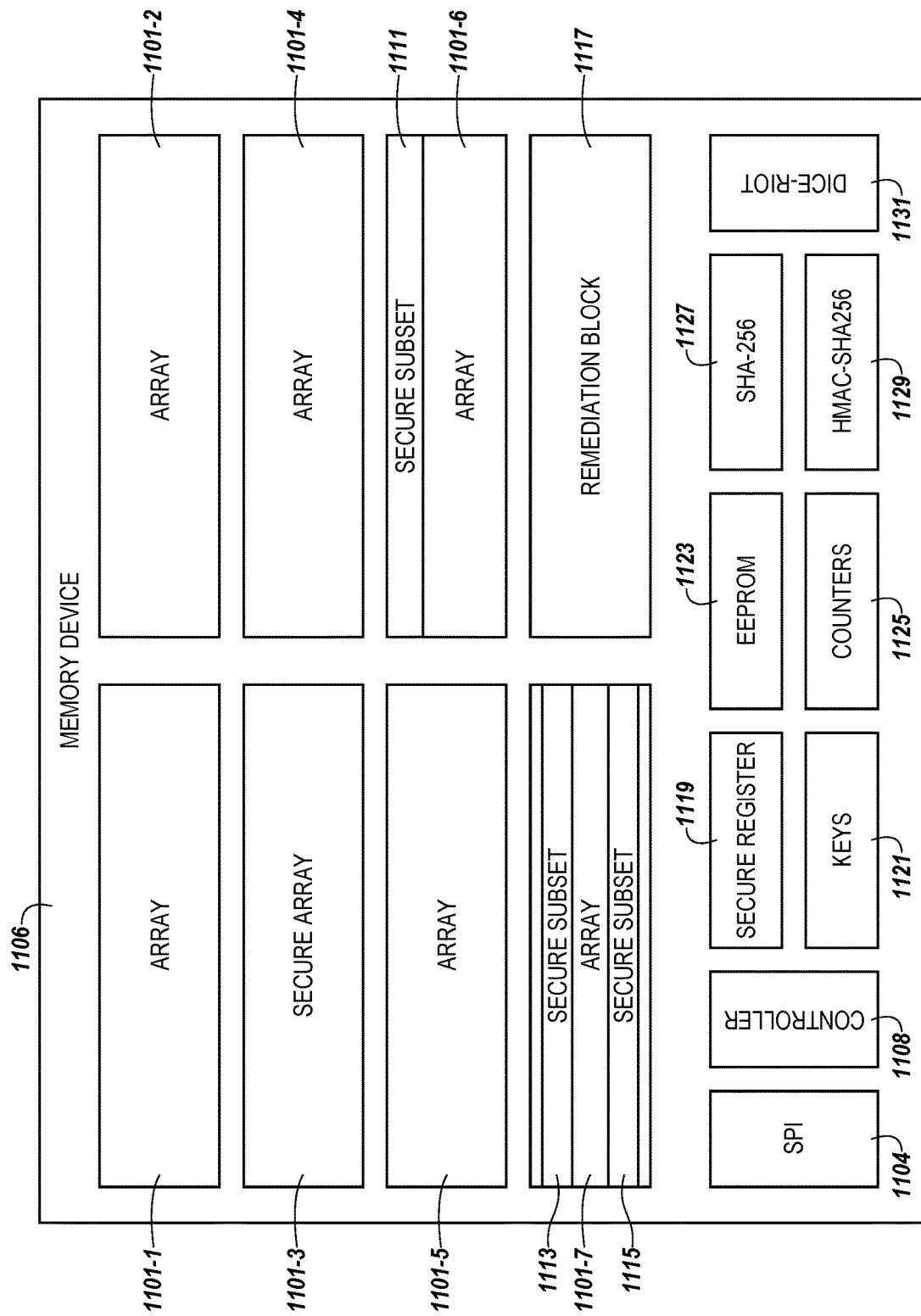
FIG. 11 is a block diagram of an example memory device in accordance with an embodiment of the present disclosure.

FIG. 11 is a block diagram of an example memory device 1106 in accordance with an embodiment of the present disclosure. Memory device 1106 can be, for example, memory device 206 previously described in connection with FIG. 2.

As shown in FIG. 11, memory device 1106 can include a number of memory arrays 1101-1 through 1101-7. Memory arrays 1101-1 through 1101-7 can be analogous to memory array 101 previously described in connection with FIG. 1. Further, in the example illustrated in FIG. 11, memory array 1101-3 is a secure array, subset 1111 of memory array 1101-6 comprises a secure array, and subsets 1113 and 1115 of memory array 1101-7 comprise a secure array. Subsets 1111, 1113, and 1115 can each include, for instance, 4 kilobytes of data. However, embodiments of the present disclosure are not limited to a particular number or arrangement of memory arrays or secure arrays.

As shown in FIG. 11, memory device 1106 can include a remediation (e.g., recovery) block 1117. Remediation block 1117 can be used as a source of data in case of errors (e.g., mismatches) that may occur during operation of memory device 1106. Remediation block 1117 may be outside of the area of memory device 1106 that is addressable by a host.

As shown in FIG. 11, memory device 1106 can include a serial peripheral interface (SPI) 1104 and a controller 1108. Memory device 1106 can use SPI 1104 and controller 1108 to communicate with a host and memory arrays 1101-1 through 1101-7, as previously described herein (e.g., in connection with FIG. 2).

As shown in FIG. 11, memory device 1106 can include a secure register 1119 for managing the security of memory device 1106. For example, secure register 1119 can configure, and communicate externally, to an application controller. Further, secure register 1119 may be modifiable by an authentication command.

As shown in FIG. 11, memory device 1106 can include keys 1121. For instance, memory device 1106 can include eight different slots to store keys such as root keys, DICE-RIOT keys, and/or other external session keys.

As shown in FIG. 11, memory device 1106 can include an electronically erasable programmable read-only memory (EEPROM) 1123. EEPROM 1123 can provide a secure non-volatile area available for a host, in which individual bytes of data can be erased and programmed.

As shown in FIG. 11, memory device 1106 can include counters (e.g., monotonic counters) 1125. Counters 1125 can be used as an anti-replay mechanism (e.g., freshness generator) for commands (e.g., to sign a command set or sequence) received from and/or sent to a host. For instance, memory device 1106 can include six different monotonic counters, two of which may be used by memory device 1106 for the authenticated commands, and four of which may be used by the host.

As shown in FIG. 11, memory device 1106 can include an SHA-256 cryptographic hash function 1127, and/or an HMAC-SHA256 cryptographic hash function 1129. SHA-256 and/or HMAC-SHA256 cryptographic hash functions 1127 and 1129 can be used by memory device 1106 to generate cryptographic hashes, such as, for instance, the cryptographic hashes of block 220 previously described herein, and/or a golden hash used to validate the data stored in memory arrays 1101-1 through 1101-7 as previously described herein. Further, memory device 1106 can support L0 and L1 of DICE-RIOT 1131.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. An apparatus, comprising:
a memory; and
circuitry configured to receive a global block from a global ledger block chain to be added to a local ledger block chain for validating an update for non-user data stored in the memory, wherein:
the global block to be added to the local ledger block chain includes:
a cryptographic hash of a current local block resident in the local ledger block chain;
a cryptographic hash of the non-user data stored in the memory to be updated; and
a payload of data for the update of the non-user data stored in the memory; and
the current local block in the local ledger block chain has a digital signature associated therewith that indicates the global block is from an authorized entity, wherein the digital signature includes a freshness field comprising a previous global block of the global ledger block chain that was previously added to the local ledger block chain;
the freshness field is compared to the cryptographic hash of the current local block resident in the local ledger block chain to validate the update; and
the cryptographic hash of the non-user data stored in the memory identifies the non-user data in the memory to be updated by the payload.

2. The apparatus of claim 1, wherein the local ledger block chain is stored in a secure array defined by a pair of registers.

3. The apparatus of claim 1, wherein the circuitry is configured to store the global block in the memory as a part of the local ledger block chain.

4. The apparatus of claim 1, wherein the circuitry is configured to receive multiple global blocks from the global ledger block chain.

5. The apparatus of claim 4, wherein the circuitry is configured to determine whether the multiple global blocks received from the global ledger block chain, by the circuitry are related to the apparatus.

6. The apparatus of claim 5, wherein the circuitry is configured to refrain from adding global blocks to the local ledger block chain, when they are unrelated to the apparatus.

7. The apparatus of claim 5, wherein the circuitry is configured to sequentially add global blocks of the multiple global blocks received from the global ledger block chain to the local ledger block chain when they are related to the apparatus.

8. The apparatus of claim 1, wherein the global block is added to the local ledger block chain when a previous local block field of the global block matches a current local block field in the current local block of the local ledger block chain.

9. The apparatus of claim 1, wherein the circuitry is configured to provide the update to a portion of code stored in a secure array in response to the circuitry validating that the update is from the authorized entity.

10. The apparatus of claim 1, wherein:
the memory comprises an array of memory cells; and
the circuitry includes a pair of registers configured to define the array.

11. The apparatus of claim 10, wherein the pair of registers includes:
a register configured to define an address of the array; and
a register configured to define a size of the array.

12. An apparatus, comprising:
a memory; and
circuitry configured to:
receive a global block from a global ledger block chain;
determine if the global block is related to the apparatus;
add the global block to a local ledger block chain for validating an update for non-user data stored in the memory to be updated, wherein:
the global block to be added to the local ledger block chain includes:
a cryptographic hash of a current local block resident in the local ledger block chain;
a cryptographic hash of the non-user data stored in the memory to be updated; and
a payload of data for the update of the non-user data stored in the memory; and
the current local block of the local ledger block chain has a digital signature associated therewith that indicates the global block is from an authorized entity, wherein the digital signature includes a freshness field comprising a previous global block of the global ledger block chain that was previously added to the local ledger block chain;
the freshness field is compared to the cryptographic hash of the current local block resident in the local ledger block chain to validate the update; and
the cryptographic hash of the non-user data stored in the memory identifies the non-user data in the memory to be updated by the payload.

13. The apparatus of claim 12, wherein the circuitry is further to generate the digital signature based on the freshness field.

14. The apparatus of claim 12, wherein the current local block of the local ledger block chain and the previous local block field of the global block of the global ledger block chain are the same.

15. The apparatus of claim 12, wherein the local ledger block chain includes multiple local blocks related to a host assembled in sequential order.

16. The apparatus of claim 12, wherein the local ledger block chain is stored in a portion of the memory that is inaccessible to a user of the memory.

17. A system, comprising:
a memory; and
circuitry to generate a local ledger block chain for validating an update to non-user data stored in the memory to be updated, wherein the local ledger block chain is comprised of a global block from a global ledger block chain, wherein the global block includes:
a cryptographic hash of a current local block resident in the local ledger block chain;
a cryptographic hash of the non-user data stored in the memory to be updated; and
a payload of data for the update of the non-user data stored in the memory; and
the current local block of the local ledger block chain has a digital signature associated therewith that indicates the global block is from an authorized entity, wherein the digital signature includes a freshness field comprising a previous global block of the global ledger block chain that was previously added to the local ledger block chain;
the freshness field is compared to the cryptographic hash of the current local block resident in the local ledger block chain to validate the update; and
the cryptographic hash of the non-user data stored in the memory identifies the non-user data in the memory to be updated by the payload; and
a host, wherein the host is configured to:
receive the local ledger block chain from the memory; and
validate the update to the non-user data stored in the memory using the received local ledger block chain.

18. The system of claim 17, wherein the host is a computing device of a vehicle and the local ledger block chain indicates updates to a software or hardware component on-board the vehicle.

19. The system of claim 17, wherein the circuitry removes a local block from the local ledger block chain when the local ledger block chain has reached a threshold.

20. The system of claim 19, wherein the circuitry removes the local block from the local ledger block chain by executing firmware to alter the root of the local ledger block chain.

21. The system of claim 17, wherein the circuitry adds the global block to the local ledger block chain as an immutable record when the circuitry determines that the freshness field included in the digital signature is an expected freshness field.

22. A system comprising:
a host including a memory; and
circuitry configured to:
generate a local ledger block chain for validating an update to non-user data stored in the memory;
receive global blocks from a global ledger block chain, wherein the local ledger block chain is comprised of global blocks from the global ledger block chain;

add a first portion of the global blocks to the local ledger block chain when a digital signature associated with each of the global blocks of the first portion is verified by the circuitry to be related to the host, wherein the digital signature includes a freshness field comprising a previous global block of the global ledger block chain that was previously added to the local ledger block chain;

compare the freshness field to a cryptographic hash in the global block received from the global ledger block chain of the current local block resident in the local ledger block chain to validate the update; and identify the non-user data in the memory to be updated by a payload using a cryptographic hash in the global block received from the global ledger block chain of the non-user data stored in the memory; and discard a second portion of the received global blocks when the second portion of the global blocks are unrelated to the host.

23. The system of claim 22, wherein each of the global blocks of the first portion include the freshness field.

24. The system of claim 23, wherein the freshness field for each of the global blocks of the first portion corresponds to a current local block of the local ledger block chain.

25. The system of claim 22, wherein the global blocks of the first portion are added to the local ledger block chain in sequential order and stored in the memory associated with the host.

* * * * *